(12) United States Patent
Nagashima

(10) Patent No.: US 7,895,140 B2
(45) Date of Patent: Feb. 22, 2011

(54) NEURAL NETWORK LEARNING DEVICE, METHOD, AND PROGRAM

(75) Inventor: Fumio Nagashima, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 12/275,778

(22) Filed: Nov. 21, 2008

(65) Prior Publication Data

US 2009/0132449 A1 May 21, 2009

Related U.S. Application Data

(63) Continuation of application No. PCT/JP2006/310119, filed on May 22, 2006.

(51) Int. Cl.
*G06N 5/00* (2006.01)
(52) U.S. Cl. .......................... 706/18; 706/45
(58) Field of Classification Search ............. 706/18, 706/45
See application file for complete search history.

(56) References Cited

U.S. PATENT DOCUMENTS

2006/0184467 A1  8/2006  Nagashima

FOREIGN PATENT DOCUMENTS

| JP | 9-91263 A | 4/1997 |
|---|---|---|
| WO | 2004/033159 A1 | 4/2004 |
| WO | WO-2004/104917 | 12/2004 |

OTHER PUBLICATIONS

Chan, et al, A Joint Compression-Discrimination Neural Transformation Applied to Target Detection, IEEE Transactions on Systems, Man, and Cybernetics—Part B: Cybernetics, vol. 35, No. 4, Aug. 2005, pp. 670-681.*
Eberhart, et al, Early Neural Network Development History: The Age of Camelot, IEEE Engineering in Medicine and Biology, Sep. 1990, pp. 15-18.*
Elman, Jeffrey, L., et al, Chapter 2: Why Connectionism?, Rethinking Innateness: A Connectionist Perspective on Development, 1996, pp. 47-106.*
Written Opinion of the International Searching Authority (Form PCT/ISA/237) of International Application No. PCT/JP2006/310119 having an International filing date of May 22, 2006.
International Search Report of PCT/JP2006/310119, date of mailing Jul. 4, 2006.

(Continued)

*Primary Examiner* — Wilbert L Starks, Jr.
(74) *Attorney, Agent, or Firm* — Fujitsu Patent Center

(57) ABSTRACT

It is possible to acquire existing techniques in a neural network model currently studied and developed so as to generalize them as an element technique, and provide modeling of a basic unit of bottom-up approach using the neural network by adding new values to the existing techniques. A network learning device builds up a network of basic units in a network section, acquires an input from a sensor input section for evaluating it, changes a coupling weight coefficient by using a correlation operation so that the evaluation value satisfies a predetermined evaluation value, and inserts a new neural network according to need.

12 Claims, 19 Drawing Sheets

OTHER PUBLICATIONS

"Extended European Search Report", mailed by EPO and corresponding to European application No. 06756425.2 on Jul. 27, 2010.

Bonaiuto, James et al., Recognizing Invisible Actions Proceedings of the International Workshop Modeling Natural Action Selection (MNAS) section 2.3; Figure 2, Jul. 25, 2005, pp. 113-120.

Dauce, E, "Learning and control with large dynamic neural networks" The European Physical Journal—Special Topics, vol. 142, No. 1, section 2.2, Introduction, paragraphs 5-6, Mar. 2007, pp. 123-161.

Harvey, Inman Learning and CTRNNs Workshop on a Dynamical Systems Approach to Life and Cognition slides 5, 6, 18, 19, Mar. 8, 2005.

Maeda, Yutaka et al., "Bidirectional associative memory with learning capability using simultaneous perturbation" Neurocomputing vol. 69, No. 1-3, Aug. 26, 2005, pp. 182-197.

McHale, Gary et al., Quadrupedal Locomotion: GasNets, CTRNNs and Hybrid CTRNN/PNNs Compared Proceedings of the 9th International Conference on the Simulation and Synthesis of Living Systems (ALIFE9) the whole document Sep. 12, 2004, pp. 106-112.

Nagashima, Fumio A Motion Learning Method using CPG/NP section 1, last paragraph; figure 2, section 3.2, last paragraph; figure 7 section 4.2, appendix A; figure 11 Aug. 17, 2006.

Righetti, Ludovic et al., "Dynamic Hebbian learning in adaptive frequency oscillators", Physica D, vol. 216, No. 2 sections 1, 2.1.2, 5, Apr. 15, 2006, pp. 269-281.

* cited by examiner

Table 1  Neuron Notation

| Network notation | RNN language notation | Remarks |
|---|---|---|
|  | var a; | Neuron |
|  | const V=1;<br>var a=V; | Neuron with initial value |
|  | const eps=0.1;<br>var a(eps); | Neuron with delay parameter |
|  | const V=1;<br>const epsV=0.1;<br>var a(eps)=V; | Neuron with delay parameter and initial value |
|  | var a(0.0); | Terminal neuron |

Table 2  Connestion Notation

| Network notation | RNN language notation | Remarks |
|---|---|---|
|  | const C = 1.2;<br>var n1, n2;<br>...<br>n1 := C * n2; | Connection |
|  | var n1, n2, n3;<br>...<br>n1 := n2 * n3; | Bilienar connection |
|  | var n1, n2, n3;<br>...<br>n1 := if(0<n2) 1<br>    * n3; | Didital switch |
|  | var n1, n2;<br>...<br>n1 := 1 * (0<)<br>    n2; | Threshold |
|  | var(eps00) = V0;<br>...<br>var n1(eps); | Variable delay parameter |

Table 3   RNN Example

| Network notation | RNN language notation | Mathematical notation |
|---|---|---|
|  | ```
circuit cir1 {
  const C=1.0;
  const eps=0.1;
  var y1(eps)=0.0;
  var y2(eps)=1.0;
  y1 := 1.0 * y1 + C * y2;
  y2 := 1.0 * y2 - C * y1;
}
``` | $\varepsilon \frac{dy_1}{dt} + y_1 = y_1 + Cy_2,$ $\varepsilon \frac{dy_2}{dt} + y_2 = y_2 - Cy_1.$ |

FIG. 8

Table 4 Practical RNN Examples

| Network | Remarks |
|---|---|
| (integrator diagram with $\frac{1}{\varepsilon}$) | Integrator |
| (motion generation RNN diagram with $c_1, c_2, c_3, -c_1, -c_2, -c_3$ oscillators feeding into summation, then to joint position/velocity with $c_p$, $-c_v$, $c_i$ and motor current) | Motion Generation and PID Control |
| (inner product diagram with $V$, $f(t)$) | Inner Product |

FIG. 13(a)
FIG. 13(b)
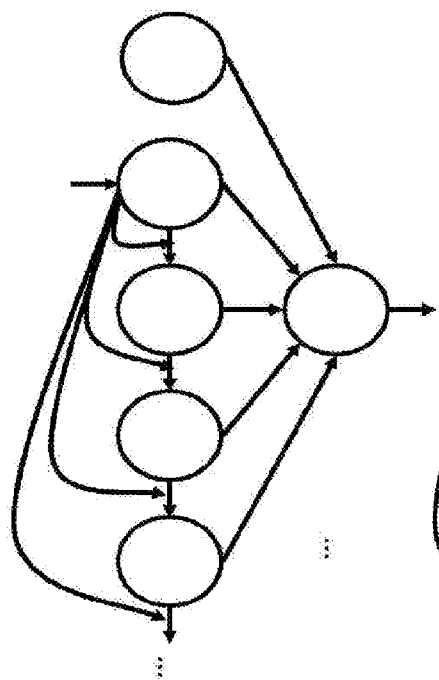
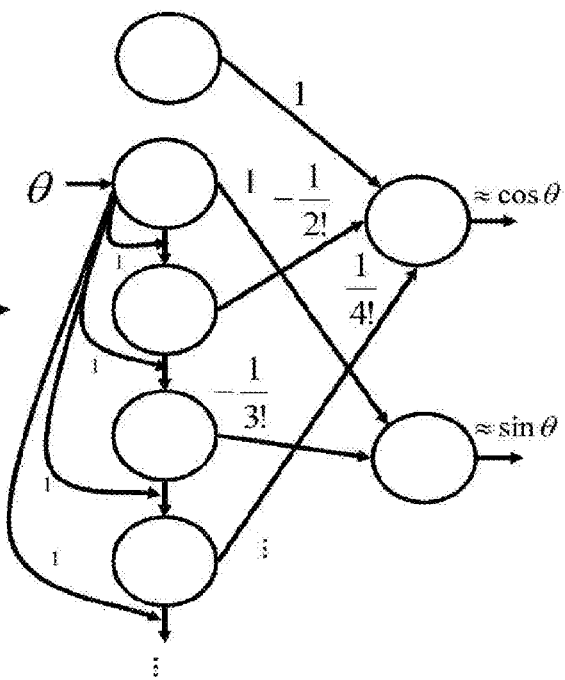
FIG. 14
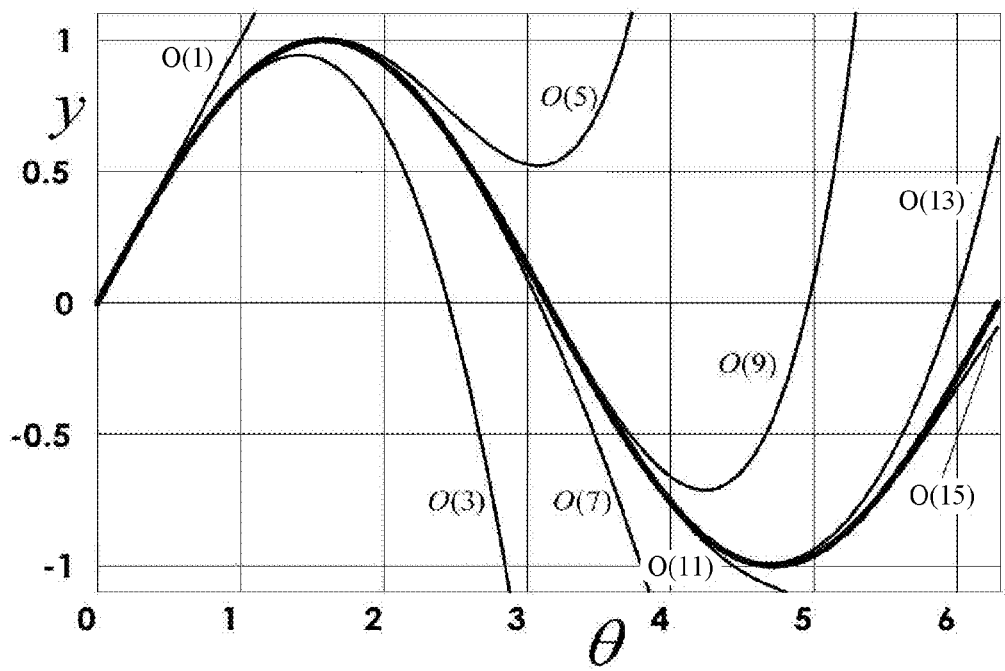

Table 5  Accuracy Estimation

| order | max error | $(\theta_1, \theta_2, \theta_3)$ rad |
|---|---|---|
| 1 | 8.50 | (-1.57,-1.57,-1.57) |
| 2 | 7.23 | (-1.57,-1.57,-1.57) |
| 3 | 3.80 | (0.292,-1.57,-1.57) |
| 4 | 2.39 | (0.292,-1.57,-1.57) |
| 5 | 1.26 | (-1.57,-1.57,-1.57) |
| 6 | $5.76 \times 10^{-1}$ | (-1.57,-1.57,-1.57) |
| 7 | $2.25 \times 10^{-1}$ | (-1.57,-1.57,-1.57) |
| 8 | $7.92 \times 10^{-2}$ | (-1.57,-1.57,-1.57) |
| 9 | $2.50 \times 10^{-2}$ | (-1.57,-1.57,-1.57) |
| 10 | $7.17 \times 10^{-3}$ | (-1.57,-1.57,-1.57) |
| 11 | $1.88 \times 10^{-3}$ | (-1.57,-1.57,-1.57) |
| 12 | $4.56 \times 10^{-4}$ | (-1.57,-1.57,-1.57) |
| 13 | $1.06 \times 10^{-3}$ | (-1.57,-1.57,-1.57) |
| 14 | $7.11 \times 10^{-3}$ | (-1.57,-1.57,-1.57) |
| 15 | $1.50 \times 10^{-2}$ | (-1.57,-1.57,-1.57) |

Cyclic motion

Non-cyclic motion

NEURAL NETWORK LEARNING DEVICE, METHOD, AND PROGRAM

TECHNICAL FIELD

The present invention relates to a neural network learning device, a method thereof, and a program thereof capable of constructing a highly accurate system at short times by adding a neural network.

BACKGROUND ART

It has been a long time since a human-friendly robot attracted attention, and studies such as motion generation control, planning, visual information processing, voice information processing has been extensively made for such a robot. As a result of the extensive studies, various achievements, such as a research-purposed humanoid robot HOAP series, have been made (refer to, e.g., Non-Patent Document 1).

Together with the abovementioned elemental technologies, a systemization technology has also been studied. Further, a study of how the elemental technologies are combined with one another so as to allow the robot to adequately function has also been advanced.

The systemization technology is considered to be roughly divided in two approaches "top-down" and "bottom-up" which are known in system architecture theory (refer to, e.g., Non-Patent Document 2).

The top-down approach is a method that constructs a system by examining a need for the system with a top-down view. Respective elements of the system have interfaces which are required from a top view point at which the entire system can be seen. Elements such as motion, recognition, and work plan are individually studied and developed, and then an interface or framework that integrates the individual elements is designed. Further, in order to improve efficiency, examination of common use or reuse technology is now being examined.

As one of the most prominent top-down approaches for the human-friendly robot, HRP (Humanoid Robot Project) is known (refer to, e.g., Non-Patent Document 3). In such an approach, required elemental technologies are analyzed by category or work process, and then common parts are extracted and integrated.

Non-Patent Document 1: Fujitsu Automation Ltd, Humanoid Robot: http://www.automation.fujitsu.com/

Non-Patent Document 2: Marvin Minsky "Logical vs. Analogical or Symbolic vs. Connectionist or Neat vs. Scruffy", in Artificial Intelligence at MIT., Expanding Frontiers, Patrick H. Winston, Vol 1, MIT Press, 1990

Non-Patent Document 3: Y Nakamura, et al.: "Humanoid Robot Simulator for the METI HRP Project", Robotics and Autonomous Systems, Vol. 37, pp 101-114, 2001

DISCLOSURE OF THE INVENTION

Problems to be Solved by the Invention

On the other hand, there are a few examples of study about bottom-up system construction. The bottom-up approach is a method that constructs the whole thing starting from small elements. The central theme of such a study is how to handle the small elements and according to what policy the elements are combined to construct the whole thing.

Although there are known, as examples of such a study related to the brain, study made by Kawato, et al (refer to, e.g., Non-patent Document 4: Mitsuo Kawato, "Computational Theory of the Brain", Sangyo Tosho, 1996) and study made by Hawking, et al (refer to e.g., Non-patent Document 5: Jeff Hawking and Sandra Blakeslee, "On Intelligence", Times, Books, 2004.9.15), the concepts of these studies have not been realized as a concrete system.

The bottom-up approach aims to design a basic unit necessary for the entire system and to construct the system using the simple basic unit. In such an approach, the first priority is to design the basic unit, and the second is to determine how large a system is constructed using the basic unit.

The present invention has been made to solve the problems of the prior art and an object thereof is to provide a neural network learning device, a method thereof, and a program thereof capable of introducing existing technologies in a neural network model currently studied and developed as an elemental technology so as to generalize them and providing modeling of a basic unit of bottom-up approach using the neural network by adding new values to the generalized existing technologies.

Means for Solving the Problems

To solve the above problems, according to a first aspect of the present invention, there is provided a neural network learning device using a perturbation method as a learning method, comprising: an input section that inputs, in an integral manner, a state in a given environment; and a learning section that evaluates an input value from the input section and determines a coupling weight coefficient between neurons using a correlation operation based on the evaluation value.

In the neural network learning method according to the present invention, the learning section performs the correlation operation using Hebb's law.

In the neural network learning method according to the present invention, the learning section performs the correlation operation using derivative deduction.

In the neural network learning method according to the present invention, the learning section uses difference approximation when performing the derivative deduction.

In the neural network learning method according to the present invention, the learning section samples the relationship between an input and an output in units of a minute motion to make the evaluation.

In the neural network learning method according to the present invention, the learning section uses the correlation operation to change the coupling weight coefficient so that the evaluation value satisfies a predetermined evaluation value and inserts a new neural network.

Further, according to a second aspect of the present invention, there is provided a neural network learning program allowing a computer to execute a neural network learning program that uses a perturbation method as a learning method, the program allowing the computer to execute: an input step that inputs, in an integral manner, a state in a given environment; and a learning step that evaluates an input value from the input section and determines a coupling weight coefficient between neurons using a correlation operation.

Further, according to a third aspect of the present invention, there is provided a neural network learning method allowing a computer to execute a neural network learning that uses a perturbation method as a learning method, comprising: an input step that inputs, in an integral manner, a state in a given environment; and a learning step that evaluates an input value from the input section and determines a coupling weight coefficient between neurons using a correlation operation.

BRIEF DESCRIPTION OF THE DRAWINGS

FIG. 8 is a table showing an example of an application network;

FIGS. 13(a) and 13(b) are views showing a general form of a network that expresses Taylor expansion;

FIG. 14 is a view showing a calculation result of the neural network shown in FIG. 13(b);

BEST MODE FOR CARRYING OUT THE INVENTION

Figure 1:
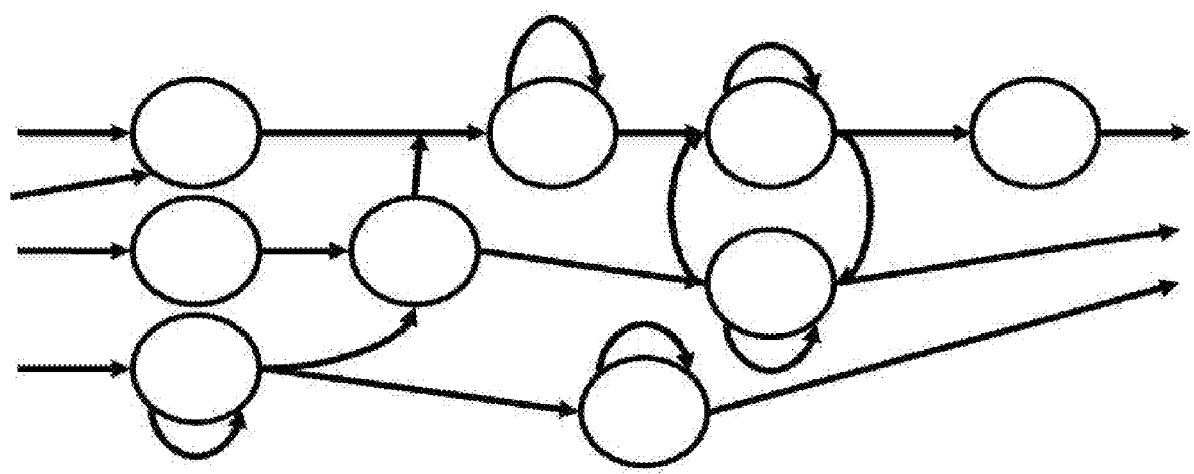
FIG. 1 is a view showing an example of a neural network.

An embodiment of the present invention will be described with reference to the accompanying drawings.

1) Neural Network

A neural network is an engineering model of a nervous system of human and animal. Therefore, the neural network is expected to be used as a suitable model in construction of a human-friendly robot. Hereinafter, in the present specification, an engineering artificial neural network is referred to merely as "neural network", and neural network in humans and animals is referred to as "nervous system".

Most of the conventional studies on the neural network have aimed to solve a certain type of nonlinearity. As described later, one of the reasons that make it difficult to construct a large-scale neural network resides in the nonlinearity.

It is considered that the nonlinearity should be present not in a basic unit in the abovementioned bottom-up approach, but in a network. Here, the outline of a neural network proposed in this specification will be described. This model is suitably used in construction of software of a human-friendly robot.

First, a conventional model having nonlinearity between input and output of a neuron itself will be overviewed.

1-1) Research Tool for Nonlinear Phenomenon

The history of research on the neural network goes back to may years. For example, there is known, as one of the oldest documents, Non-patent document 6 (McCulloch, W and Pitts, W, A: "logical calculus of the ideas immanent in nervous activity", Bulletin of Mathematical Bio-physics, 7: 115-133. 1943).

According to the above document, an approach which was somewhat different from a traditional mathematical approach, such as adoption of a threshold value, had been made. The many conventional neural network models have nonlinearity between the input and output of a neuron and thus are used in the research on complex systems or chaos which is a new field of mathematics. Further, an invention of a learning rule using error propagation method is revolutionary.

However, the neural network and engineering using a nonlinear phenomenon are originally different from each other. Although the engineering using a nonlinear phenomenon itself is a promising research topic, it originally has no correlation with the neural network. This is because that the neural network is an engineering model itself of a nervous system of a living organism irrespective of the type of mathematics to be used in the neural network.

It is important to remember that the neural network has another side from a view point of engineering. That is a neural network as a notation system of a large-scale engineering system. A conventional neural network aggressively using a nonlinear phenomenon has both an advantage and a drawback.

As an advantage, a neural network using a sigmoidal function for a high-dimensional input is superior to a linear system, as described in, e.g., Non-patent Document 7 (A. Barron: "Universal approximation bounds for superpositions of a sigmoidal function", IEEE Trans. on Information Theory, IT-39, pp. 930 (1993)).

An error back propagation learning can be said to be a revolutionary learning rule effectively using the feature of the sigmoidal function. Further, it is known that, by using a nonlinear pull-in effect, a very small network can fulfill various functions from motion generation to sensor feedback (refer to, e.g., Non-patent Document 8: Yasuhiro Fukuoka and Hiroshi Kimura: "Adaptive Dynamic Walking of a Quadruped Robot on Irregular Terrain based on Biological Concepts-Adjustment based on somatic sensation and vestibular sensation—" Journal of Robotics Society of Japan 19-4, pp. 510-517, 2001).

However, from a viewpoint of system construction, such a neural network has a serious drawback. That is, there is an advantage that, since a small system produces various responses, it is not necessary to increase the system size for a problem with a scale smaller than a predetermined scale, while there is a drawback that, when such small systems are combined in order to solve a problem with a larger scale, the entire system property significantly changes with the result that it is impossible to utilize findings obtained from individual subsystems.

It is unlikely, due to mutual network interference, that individual systems function normally when a certain numbers of such systems are aggregated. Further, under present circumstances, there has not established a method for coping with such a case where the systems cannot operate satisfactorily.

Therefore, with regard to a neural network of this kind, only one with a comparatively smaller scale can be employed for actual use. Opinions differ among researchers as to the number of systems needed for constructing a practical neural network. Incidentally, a nervous system of insect or animal is composed of an enormous number of nerve cells. In the case of human, the number of the nerve cells is about 1 billion to 100 billion.

When considering constructing robot software using a neural network, it is estimated that a system becomes a considerably large-scale, although the number of systems need not be increased up to a number comparable to one of the nerve cells of real insect or animal. It is natural, from a view point of engineering, to design a large-scale system as an aggregation of small systems.

As one solution to such a problem, there is a method of locally confining influence of nonlinearity and adopting a modular configuration (refer to the abovementioned Non-Patent Document 4). As another solution, there is a method of handling the nonlinearity as an expansion of a linear system. In the following, discussing will be made of this point.

1-2) Robot System Description Tool

The notation system of the neural network basically includes only two elements: neuron and connection, and they are graphically expressed as "o" and "→", respectively. This standardized notation system may integrate various engineering descriptions. That is, this notation system could be a general-purpose interface between elements of a system, such as a robot system, in which various processing are required to be performed in a standardized manner.

The condition required for a neural network standing in such a position is to construct a model with a possibly highly generalized description. Most part of the engineering processing is expressed using a linear algebraic equation system or linear differential equation system. The neural network needs to satisfy, for system construction, at least the condition that it can express the linear algebraic equation system and linear differential equation system. Logical operation is another important requirement. Without using the logical operation, conditional processing cannot be performed. The conditions required for the neural network are summarized as follows.

(1) Able to express a linear algebraic equation system
(2) Able to express a linear differential equation system
(3) Able to perform rational logical operation A neural network satisfying the above requirement is considered. First, in order for the neural network to be able to handle the linear algebraic equation system (condition (1)), there should not exist nonlinearity in the relationship between input and output of state quantity of the neuron. This is very important. If there exists nonlinearity in the relationship between input and output of state quantity, the nonlinearity appears without fail in an equation system except for a case where no connection exists in the neural network. The nonlinearity cannot be removed by any identity transformation.

That is, in this case, it is impossible to express the linear algebra. It should be noted that all the nonlinearities need not be removed.

As described later, by removing the nonlinear effect from the input and output portions of a neuron and burying the nonlinear effect in the connection portion, it is possible for the neuron network to handle both the linear algebraic and nonlinear phenomenon such as chaos.

Figure 2A:
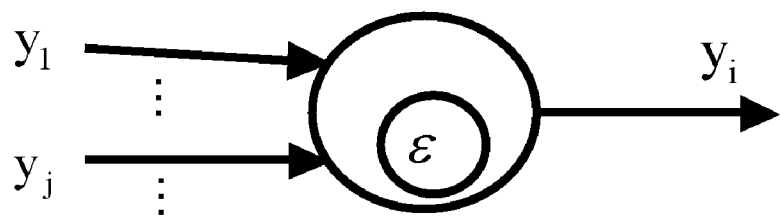
FIGS. 2(a) to 2(c) are views each showing a model of a neuron.

Secondary, in order for the neural network to be able to handle the linear differential equation system (condition (2)), it is necessary to introduce a differential relation into the relationship between input and output of state quantity of the neuron. The simplest method for introducing the differential relation is to regard the neuron as an integrator. However, this method has a problem that, when the neuron is regarded as an integrator, the linear algebraic cannot be expressed. That is, the above first condition cannot be satisfied. Some solutions can be applied to solve this problem, and the simplest solution is to introduce "delay" as shown in expression (1) (refer to FIG. 2(a)).

[Numeral 1]

$$\varepsilon \frac{dy_i}{dt} + y_i = \sum_j C_{ij} y_j \qquad (1)$$

In the above expression, $\varepsilon$ is delay parameter, yi and yj are state quantity of the neuron, Cij is weight coefficient, and t is time. When considering an extreme state where there is no delay (i.e., $\varepsilon \to 0$ is satisfied), the expression (1) is changed to expression (2) where a linear algebraic system cam be implemented.

[Numeral 2]

$$y_i = \sum_j C_{ij} y_i \qquad (2)$$

(if $\varepsilon \to 0$)

Figure 2B:
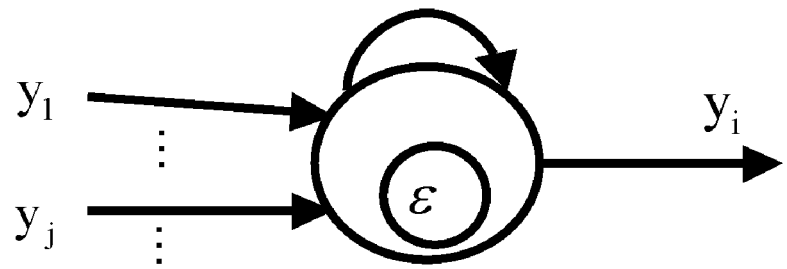

"Delay" is a physics model naturally appearing in heat transfer or information transmission process and is suitably used as a model of the neuron. Further, a simple integrator can be implemented by a loop-like connection as shown in FIG. 2(b). This connection corresponds to addition of yi to the right side of the expression (1), so that both side yi(s) are canceled each other as shown in expression (3), allowing implementation of the integrator.

[Numeral 3]

$$\varepsilon \frac{dy_i}{dt} + y_i = y_i + \sum_j^{i \neq j} C_{ij} y_j \qquad (3)$$

Finally, implementation of rational logical operation is considered (condition (3)). As can be seen from the above two conditions, there is no nonlinearity in the relationship between input and output of state quantity of the neuron in the neural network model according to the embodiment of the present invention. Therefore, when considering only a normal connection, logical operation such as Exclusive OR cannot be performed.

Figure 2C:
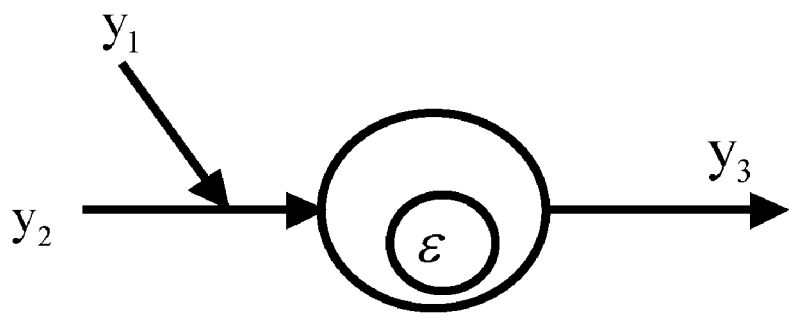

Here, "bilinear coupling" is introduced. This is a coupling as shown in FIG. 2(c) and corresponds to implementation of Sigma-pi unit disclosed in Non-patent Document 9 (D. E. Rumelhart, G. E. Hinton, and J. L. McClelland: "A general framework for Parallel Distributed Processing", In D. E. Rumelhart and J. L. McClelland (Eds.): "Parallel Distributed Processing: Explorations in the Microstructure of Cognition", Vol. 1, pp. 45, Cambridge, Mass., MIT Press, 1986.). In the logical operation, the bilinear coupling handles connection of AND operation.

Figure 3:
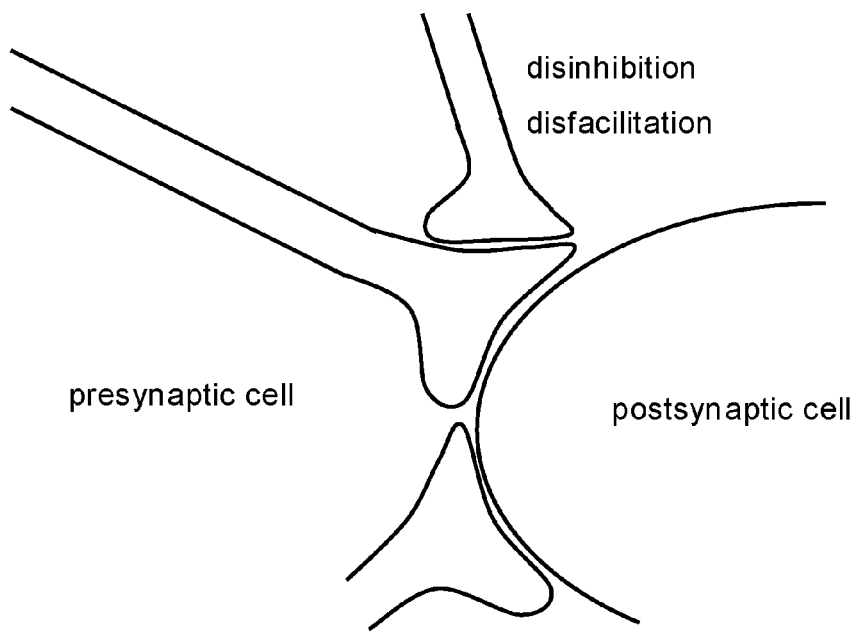
FIG. 3 is a view showing a model of a synapse.
Figure 4:
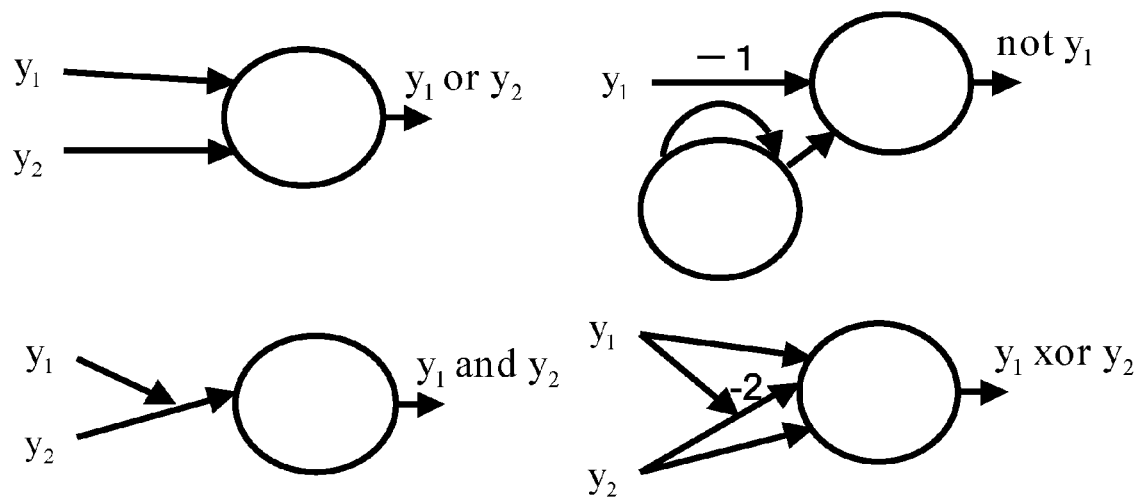
FIG. 4 is a view showing logical operators.

In a typical neural network, logical OR and logical AND are often implemented by changing a weight or threshold value in the same circuit. This is, however, unnatural, because the logical OR and logical AND are entirely different from each other in nature. The model of FIG. 2(c) regards the above configuration as natural. The "bilinear coupling" can be said to be a perfectly natural model of presynaptic inhibition actually existing in a nervous system shown in FIG. 3. Using the "bilinear coupling", logical OR, logical AND, logical NOT, and exclusive OR are expressed as shown in FIG. 4. Coupling coefficient which is not shown in the drawing is 1, delay $\epsilon$ is 0, "or" is logical OR, "and" is logical AND, "not" is logical NOT, and "xor" is exclusive OR. To use a result of the logical operation in the bilinear coupling is unnatural, so that a digital switch is introduced. This digital switch is used for reflecting a result of the logical operation in a system, and the most typical usage thereof is "analytic continuation".

A concrete example in which the digital switch is used will be described in "4-2) Inverse kinematics". The outline of the neural network according to the present embodiment has been described above. It can be said that, as compared with a neural network using an existing nonlinear basic unit, the neural network according to the present embodiment has a configuration in which the nonlinearity is relocated from the input and output portions of the neuron to the connection. This configuration allows handling of a linear equation and nonlinear equation such as chaos in the same network model.

There has already been known a motion generation system based on the neural network model-NueROMA (Non-patent Document 1 and NON-patent Document 10: "Humanoid Robot Motion Generation System-NueROMA-", Journal of Robotics Society of Japan, Vol. 22 No. 2, pp. 34, 2004).

Figure 5:
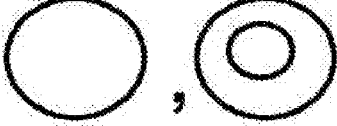
FIG. 5 is a table showing a first notation system of connection between neurons.
Figure 5:
Figure 5:
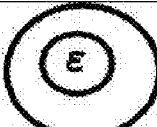
Figure 5:
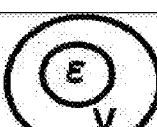
Figure 5:
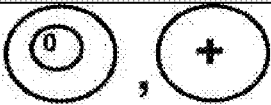
Figure 6:
FIG. 6 is a table showing a second notation system of connection between neurons.
Figure 6:
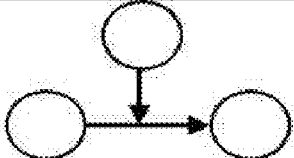
Figure 6:
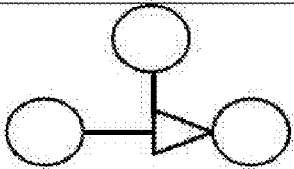
Figure 6:
Figure 6:
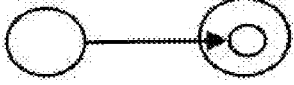
Figure 7:
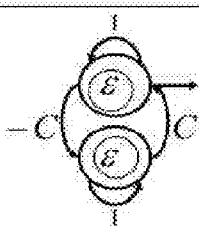
FIG. 7 is a table showing a relationship between RNN language notation and mathematical notation.

The notation systems of a neuron and a coupling between neurons used in the above document are shown in FIGS. 5 and 6. In these tables, Threshold is introduced as a special shorthand for the digital switch, and Variable delay parameter is introduced in terms of symmetric property of the system. FIG. 7 shows a relationship between RNN language notation and mathematical notation, and FIG. 8 shows an example of a simple application network in terms of motion generation and PID control.

Next, an important basic structure of a network using the abovementioned neuron model will be overviewed from a viewpoint of an association between networks or transformation of the network.

2) Basic Elemental Structure

Although various neural networks have been proposed, respective networks are treated as completely different things, and studies about an association between them or dynamic transformation of each network have hardly been made. This poses no problem for a neural network as a subsystem of a robot system, but is an insufficient study policy and result for a neural network aiming to achieve integration.

The object of the neural network according to the present invention is to construct an integrated system. That is, a construction of a network capable of dynamically changing in order to adapt to the external world that is momentarily changing. Thus, as to typical subnetworks, a consideration about an association between respective subnetworks or changing process thereof is very important.

In particular, an association between a network expressed by an algebraic equation and a differential equation which will be described in "2-2) CPG" is important. It is difficult to consider such a changing process only with a mathematical notation.

2-1) Linear Mapping, Correlation Operation, Associative Memory

In the neural network model according to the present embodiment, the relationship between the input and output of the neuron is linear. The starting point of a basic unit constituting such a neural network is linear transformation. The linear transformation is expressed in the form of correlation operation or linear associative memory. Note that the correlation operation is referred to as Hebb's law in physiology and as derivative deduction in mathematics.

It can be said that the correlation operation is an inner product of standardized inputs, and the linear associative memory (association) (Non-patent Document 11: "Associatron—a model of associative memory", IEEE Transaction on Systems Man and Cybernetics, SMC 2,381-388 (1972).) is obtained by multiplying the correlation operation and standardizing the outputs therefrom.

The correlation operation has been known as a basic mechanism of memory and, more particularly, auto correlation operation has satisfactory characteristics as a mechanism of memory that can recover original information from an ambiguous input.

2-2) CPG (Central Pattern Generator)

A CPG can be considered as a modification of the associative memory. In order to explain this association, a simple and very small associative memory as shown in FIG. 9 (a) is taken as an example. This associative memory can be expressed as the following expression (4).

[Numeral 4]

$$\begin{bmatrix} y_1 \\ y_2 \end{bmatrix} = \begin{bmatrix} 1 & -1 \\ 1 & 1 \end{bmatrix} \begin{bmatrix} x_1 \\ x_2 \end{bmatrix} \tag{4}$$

When a vector like (x1;x2)=(1;0) is input to this associative memory network, it is transformed into (y1;y2)=(1;1) as an output.

In the associative memory, such a transformation is referred to as memory recall. Here, considered is successive memory recalls. As shown in the following expression (5), the output of the associative memory circuit is recursively input under an adequate initial condition.

[Numeral 5]

$$\begin{bmatrix} y_1^{(0)} \\ y_2^{(0)} \end{bmatrix} = \begin{bmatrix} 1 \\ 0 \end{bmatrix} \tag{5}$$

$$\begin{bmatrix} y_1^{(i+1)} \\ y_2^{(i+1)} \end{bmatrix} = \begin{bmatrix} 1 & -1 \\ 1 & 1 \end{bmatrix} \begin{bmatrix} y_1^{(i)} \\ y_2^{(i)} \end{bmatrix}$$

Figure 9A:
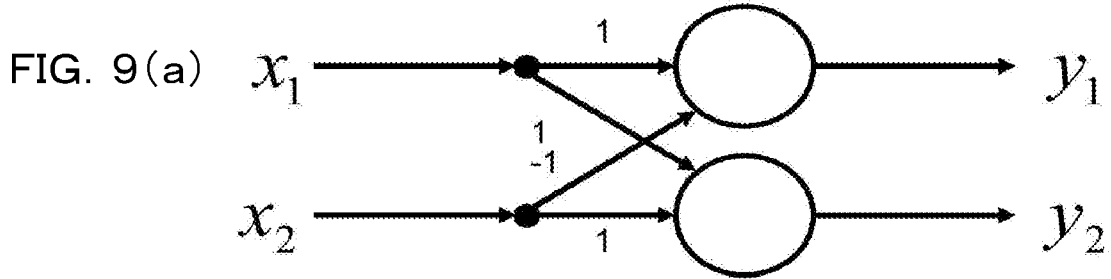
FIGS. 9(a) to 9(e) are views showing an example of a CPG.
Figure 9B:
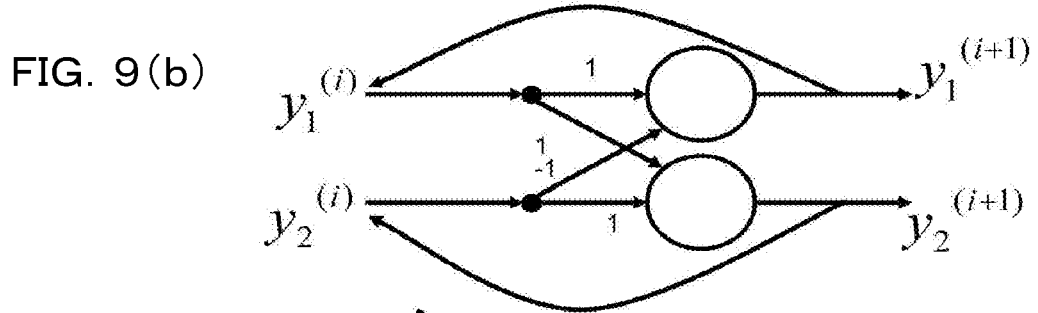
Figures 9C, 9D:
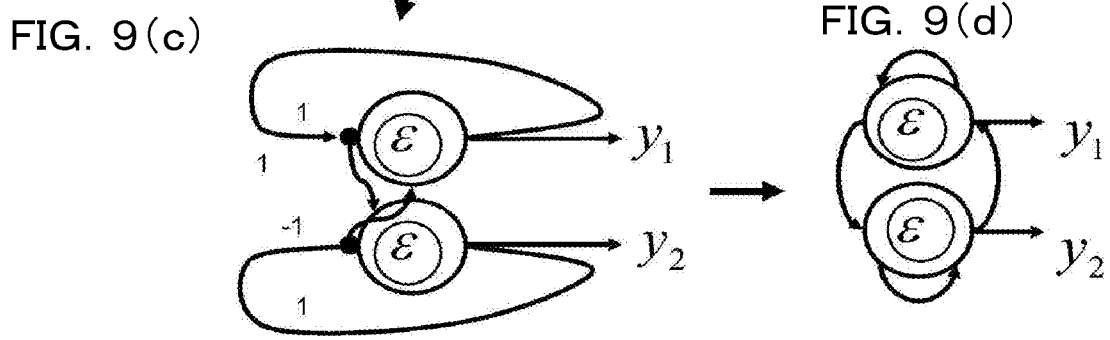
Figure 9E:
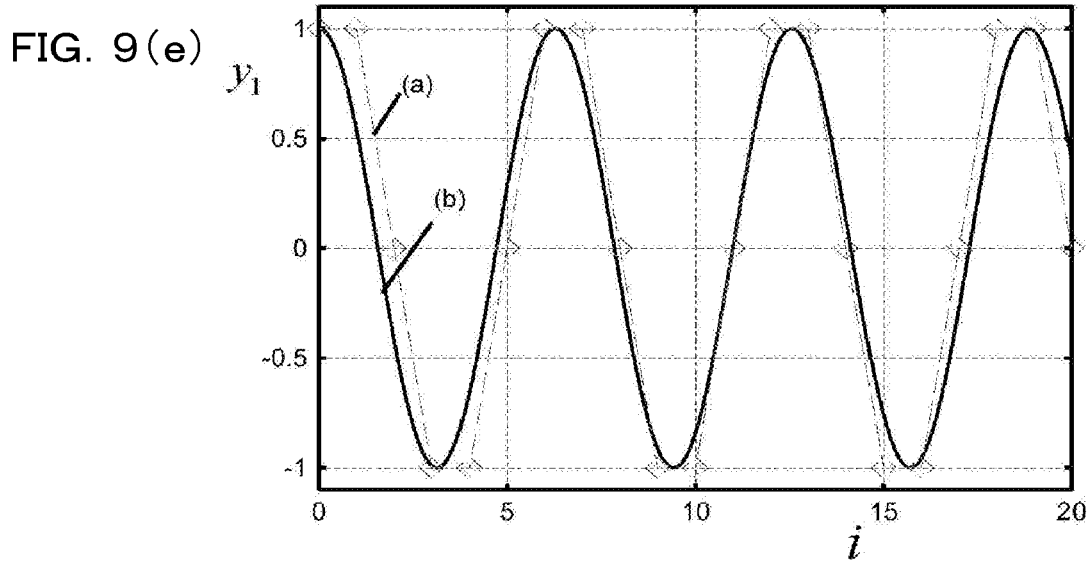
Figure 10A:
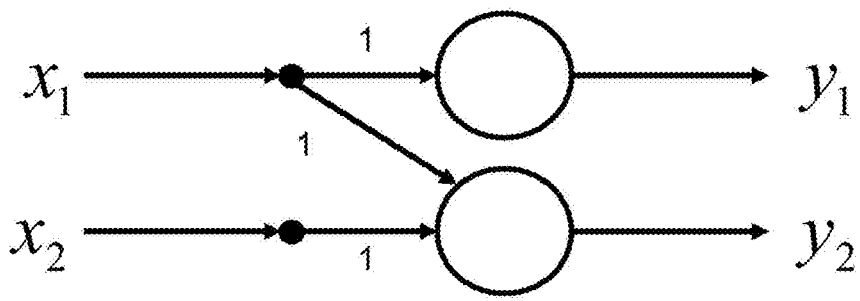
FIGS. 10(a) to 10(e) are views showing elements of a CPG of a type different from the CPG shown in FIG. 9.
Figure 10B:
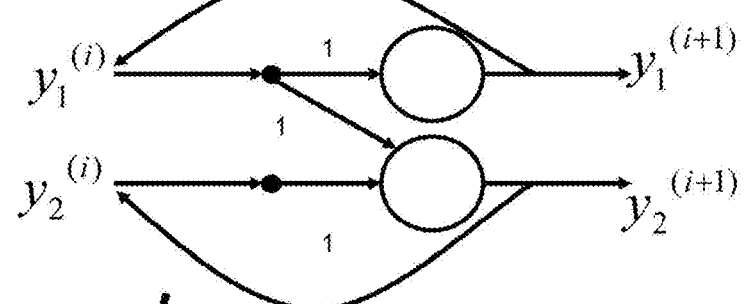
Figure 10C:
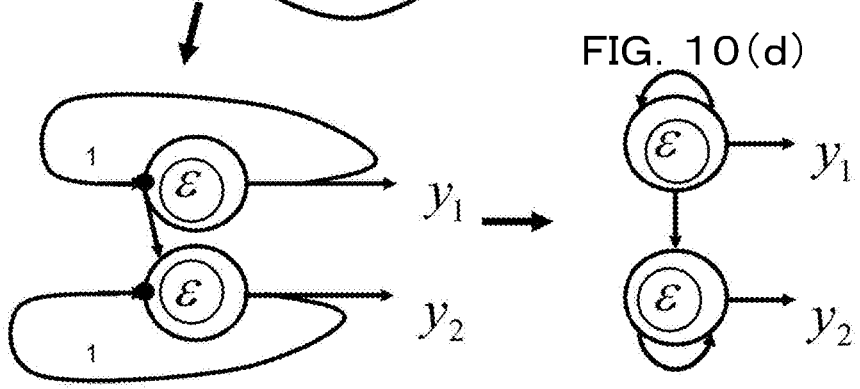
Figure 10D:
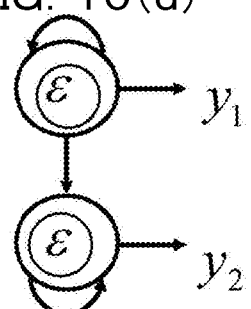
Figure 10E:
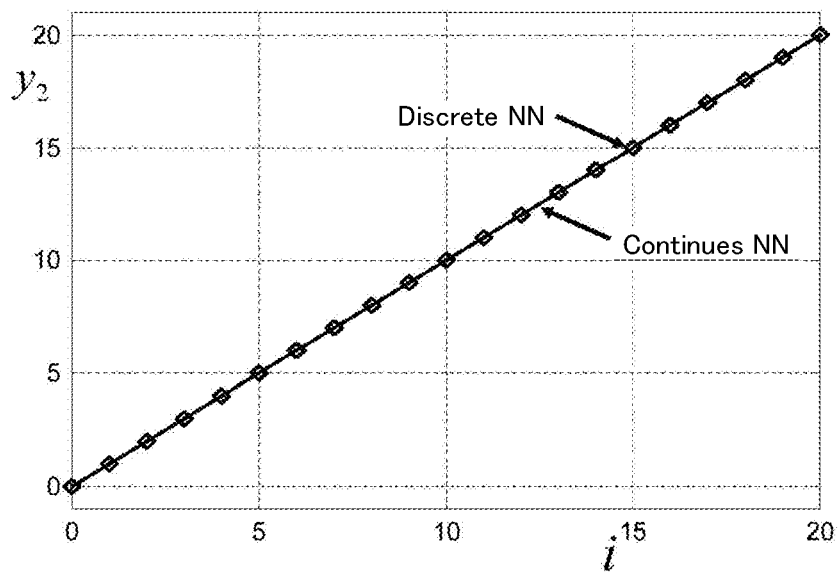
Figure 11:
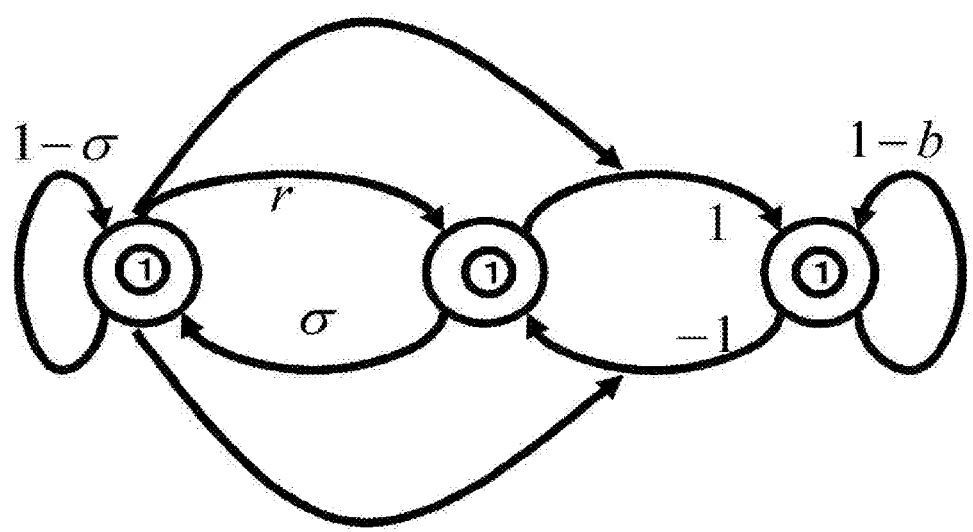
FIG. 11 is a view showing a neural network of Lorenz equation.

When y1 is plotted at respective i(s), the result is as shown in FIG. 9(e). This is a periodic function with period 6. Further, the limit of time difference −t is calculated with time i set as continuous time t, the following expression (6) can be obtained.

[Numeral 6]

$$\frac{dy_1}{dt} = -y_2, \frac{dy_2}{dt} = y_1 \quad (6)$$

Accordingly, the following expression (7) can be obtained.
[Numeral 7]

$$\frac{d^2 y_1}{dt^2} + y_1 = 0 \quad (7)$$

Under an adequate initial condition, a perfect trigonometric function with period $2\pi$ (to 6) is obtained as shown in 9(e). This is referred to as a CPG, which corresponds to a CPG disclosed in Non-patent Document 12 (Fumio Nagashima: "A Motion Learning Method using CGP/NP", Proceedings of the 2nd International Symposium on Adaptive Motion of Animals and Machines, Kyoto, Mar. 4-8, 2003).

That is, the CPG can be regarded as successive memory recalls in the associative memory. An example of a CPG of a different type is shown in FIG. 10. The output of the CPG of this type becomes a linear function.

It should be noted here that to derive the expression (7) from expression (4) using a mathematical transformation is not intuitive. As shown in FIGS. 9 and 10, by using the notation system of the neural network, the association between the two expressions can be explained as a successive and intuitive change.

2-3) Bilinear Coupling, Parametric Excitation, Nonlinear Input/Output Neuron

The bilinear coupling in which coupling weight is influenced by another neuron is said to be a variable coefficient equation as viewed from the standpoint of theory of linear algebraic equation system/linear differential equation. By using this mechanism, it is possible to perform a calculation that cannot be achieved in the linear associative memory. The most typical example is exclusive OR shown in FIG. 4.

Another example is a parametric excitation. It is known that, in the parametric excitation, excitation different from resonance occurs. That is, a variation is added to input data processing. A concrete example will be described in 4-4) voice analysis.

By using the bilinear coupling in a duplicated manner, it is possible to construct a neural network similar to a partial reverse method of the nonlinear neuron. This corresponds to that an output is expressed by a cubic polynomial.

2-4) Chaos

The bilinear coupling can directly express chaos depending on the use. For example, a neural network of a Lorentz equation shown in FIG. 8 is shown in FIG. 10.

[Numeral 8]

$$\begin{cases} \frac{dx}{dt} = -\sigma x + \sigma y \\ \frac{dy}{dt} = -y + rx - xz \\ \frac{dz}{dt} = -bz + xy. \end{cases} \quad (8)$$

However, such a chaos network must be used carefully. Because to use the chaos for settled motion is not rational.

3) System Construction Guideline

Almost every environment that a robot faces includes a nonlinear element, excluding an idealized environment that has artificially been made in an experimental laboratory. In order to achieve an adequate motion or recognition under the nonlinear environment, a systematic approach is required.

When considering a system based on a conventional dynamics calculation or logical operation, it is necessary to construct models of things (including the robot itself) in a given environment. That is, motion generation, planning, and the like can be achieved only after all the models of the things in a given environment. When all the models of the things in a given environment cannot be constructed, no effect can be obtained. Further, considering efforts for constructing the model and resources such as memory, difficulties are involved in the construction of a system adaptable to various environments.

In the above model-based method, there is also conceivable a method in which solutions supposed to be required are previously prepared as a database for future retrieval. Whatever the case may be, tremendous efforts and resources are required.

A neural network having a nonlinear element is considered. In this case, there is a very powerful mechanism called "learning", so that there is a possibility that the neural network can adapt to various environments. However, an existing learning algorithm for the neural network requires tremendous time. Further, in the case where various neural networks are driven at a time, influence of interaction between the networks increases the difficulty in system construction.

Although there is available a method in which a neural network capable of responding all cases and coefficients are learned on the moment, tremendous time is required for starting normal operation. To cope with this problem, a numerical perturbation method is used in the present embodiment.

How the numerical perturbation method functions will be described below. First, the outline of a normal perturbation method will be described. For general theory of the perturbation method, refer to, e.g., Non-Patent Document 13 (Richard Bellman, "Perturbation on Techniques in Mathematics, Engineering and Physics", Dover Publications; Reprint Edition, Jun. 27, 2003) and Non-patent Document 14 (E. J. Hinch, etc., "Perturbation Methods", Cambridge University Press, Oct. 25, 1991).

According to the numerical perturbation method, originally existing neural networks can be reused in the case where a new neuron is added. It is possible to perform a changing process and learning process little by little while increasing the number of neurons. A concrete procedure of the change and learning processes will be described in 4-1) Forward kinematics.

3-1) Perturbation Method

First, considered is a simple nonlinear equation as shown in the expression (9).

[Numeral 9]

$$x^2 + \epsilon x - 1 = 0 \quad (9)$$

This expression is analytically solved to obtain the following expression (10).

[Numeral 10]

$$x = -\frac{1}{2}\epsilon \pm \sqrt{1 + \frac{1}{4}\epsilon^2} \quad (10)$$

A different viewpoint is taken for explaining the perturbation. First, in the case where $\epsilon$ is small enough to be neglected, the expression (10) can be transformed into the following expression (11).

[Numeral 11]

$$x^2-1=0 \qquad (11)$$

The expression (11) can easily be solved without a use of a square-root formula and "x=±1" can be obtained as a first approximate solution. Here, considered is a case where the degree of approximation is successively increased. To this end, x is expanded as shown in the following expression (12).

[Numeral 12]

$$x(\epsilon)=x_0+x_1\epsilon+x_2\epsilon^2+ \qquad (12)$$

Figure 12:
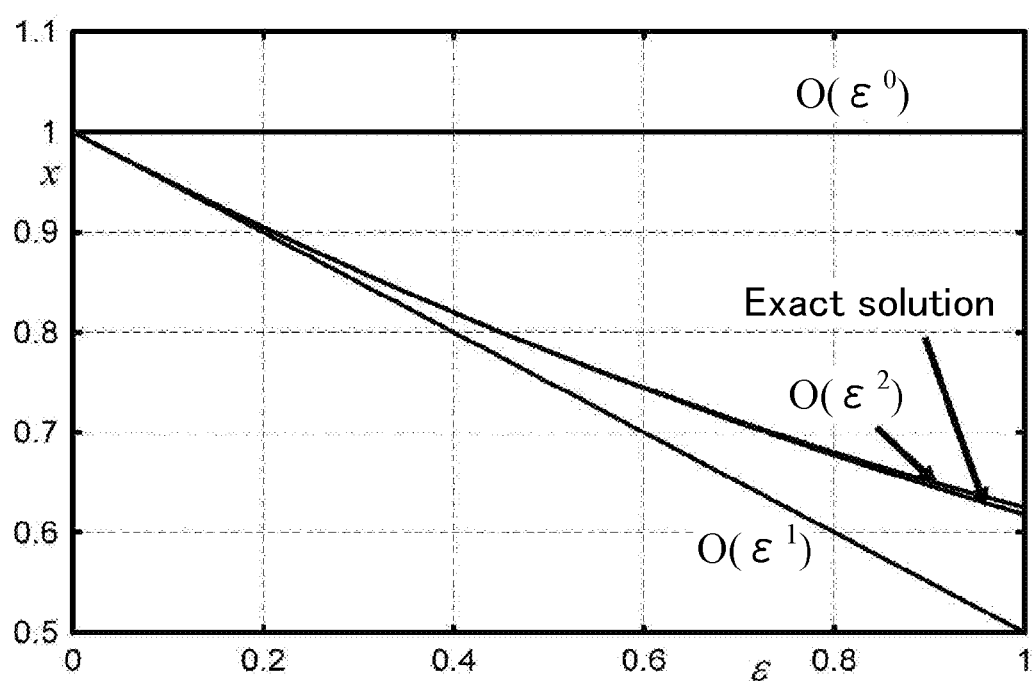
FIG. 12 is a view showing an exact solution and an approximate solution.

The expression (12) is assigned to the expression (9). Then, the expression (9) is satisfied even irrespective of the value of $\epsilon$, so that when the expression is divided in units of the order of 6, the approximate solution is systematically obtained as shown in the following expression (13). In this case, however, a positive solution is selected as the approximate solution. An exact solution and approximate solution are shown in FIG. 12.

[Numeral 13]

$$O(\epsilon^0) : x_0^2 - 1 = 0 \quad \to x_0 = 1 \qquad (13)$$

$$O(\epsilon^1) : 2x_1 = -x_0 \quad \to x_1 = -\frac{1}{2}$$

$$O(\epsilon^2) : 2x_2 = -x_1^2 + x_1 \quad \to x_2 = \frac{1}{8}$$

$$\vdots$$

When the degree of approximation progresses up to $O(\epsilon^2)$, it can be seen that the approximate solution converges to the exact solution. Even in the area where $\epsilon\approx 1$, the degree of approximation has suitably been increased. It is known that in the case where the solution has been known as shown in the expression (10), these results can be calculated using Taylor's theorem.

The same can be applied to a differential equation. In the case of the differential equation, solution of each order is a function form changing with time. For, e.g., an equation which is supposed to have a periodic solution, a solution is expanded as shown in the following expression (14).

[Numeral 14]

$$x=c_0+c_1\cos t+s_1\sin t+c_2\cos 2t+ \qquad (14)$$

The expression (14) is assigned to an equation system with unknowns to sequentially obtain $c_0, c_1, \ldots, s_1, s_2, \ldots,$ . That is, the part of x in the expression (14) assumes sin t, sin 2t, ..., . For an equation system which is not periodic, x is expanded, on the assumption that a change occurs in short time, to obtain $1, t, t^2, t^3, \ldots,$ . Further, a combination of the above processes can be considered.

3-2) Numerical Perturbation Method

A case where the above perturbation method is numerically performed is considered. This corresponds to, in the case of the algebraic equation as shown in the above example, a function fitting problem. When fitting is sequentially performed stating from the first-order term of a function to be obtained, the numerical perturbation is achieved. In the case of the differential equation, to determine $c_0, c_1, \ldots,$ using various learning methods on the assumption that expansion has been made as shown in the equation (14) is defined as the numerical perturbation method.

More concretely, an example in which a relationship between an input and an output is clear is shown. First, as the simplest example, a case where an unknown function form is expressed by the following expression (15) is shown.

[Numeral 15]

$$y=y(x) \qquad (15)$$

It is assumed that an output y corresponding to a given input x is known (able to be measured or specified). Assuming that this function can be Taylor-expanded, expansion can be made as shown in the following equation (16) using Taylor's theorem (mean-value theorem) in the vicinity of x=x0.

[Numeral 16]

$$y(x_0+\delta x) = y(x_0) + \frac{1}{1!}\left(\delta x\frac{d}{dx}\right)y(x_0) + \frac{1}{2!}\left(\delta x^2\frac{d^2}{dx^2}\right)y(x_0) + \ldots \qquad (16)$$

Therefore, this problem results in a problem of calculating derivatives in the case where x=X0 is satisfied. When y(x) is observable, these derivatives can be obtained using differential approximation. Further, when the derivatives are calculated from the observed x and y, a solution can be obtained. The x0 needs to adequately be selected depending on the type of a problem. The application range of $\delta x$ also differs depending on the type of an approximating function form. This range is often large unexpectedly.

In the case of multivariable system, a total differential form is used. That is, when an unknown function form can be expressed by the following expression (17), expression (18) can be obtained as an approximate solution.

[Numeral 17]

$$y=y(X)$$

$$X(x_1, x_2, \ldots, x_n) \qquad (17)$$

[Numeral 18]

$$y(X_o+\delta X) = \qquad (18)$$

$$y(X_o) + \frac{1}{1!}\left(\delta X\cdot\frac{d}{dX}\right)^1 y(X_o) + \frac{1}{2!}\left(\delta X\cdot\frac{d}{dX}\right)^2 y(X_o) + \ldots$$

However, the following conditions need to be met.

$$\delta X=(\delta x_1, \delta x_2, \ldots, \delta x_n)$$

$$(\delta x\cdot d/dX)^k=(\delta x_1\partial/\partial X_1+\delta x_2\partial/\partial x_2+\ldots+\delta x_n\partial/\partial x_n)^k$$

A concrete example concerning the numerical perturbation method will be described in 4-1) forward kinematics.

4) Concrete Examples

Hereinafter, the present invention will be described using concrete examples.

4-1) Forward Kinematics

First, forward kinematics, which is a basic issue in robotics, will be described. The forward kinematics can be regarded as transformation from one vector to another which includes transformation of a trigonometric function. Here, a discussion will be given of whether the trigonometric function itself can be constructed in the neural network initially proposed.

To express the trigonometric function by the proposed network, Taylor-Maclaurin expansion (hereinafter, referred to merely as "Taylor expansion") as the following expression (19) is used.

[Numeral 19]

$$y(\theta) = C_0 + C_1\theta + C_2\theta^2 + \quad (19)$$

In the above expression, y(θ) is a function that needs to be approximated, and trigonometric functions C0, C1, and C2, . . . are coefficients of the respective orders. A general form of a network that expresses this Taylor expansion is shown in FIG. 13 (*a*). Considered, as a sample question, is a case where an approximate solution is calculated using a sine function and its neural network. The sine function is expressed using Taylor expansion as the following expression (20).

[Numeral 20]

$$y(\theta) = \sin\theta = \theta - \frac{1}{3!}\theta^3 + \frac{1}{5!}\theta^5 - \frac{1}{7!}\theta^7 + \frac{1}{9!}\theta^9 - \frac{1}{11!}\theta^{11} + \ldots \quad (20)$$

As a result, the neural network is as shown in FIG. 13 (*b*). A calculation result obtained by the approximation process is shown in FIG. 14. A bold line indicates sin θ and other lines indicate approximate solutions. O(n) indicates that $\theta^n$-order approximation solution has been used. Although the graph of FIG. 14 covers up to O(15), the fact is that O(17) is overlapped with the bold line and cannot be seen. That is, it can be understood that when a polynomial of 17th-order is used, approximate solutions are obtained with high accuracy up to 360-degree.

Since the same is true in the minus region, a satisfactory accuracy can be obtained with a joint rotating by ±360-degree. For example, in the case of a joint rotating by ±90-degree, a use of a polynomial of about fifth-order achieves a satisfactory accuracy.

Joints of humans and animals can only rotate by approximately ±90-degree, and there are little joints that can rotate by ±180-degree. For such joints, it is possible to construct a network capable of solving kinematics problems by using a trigonometric function approximating in the proposed network.

4-1-1) Analytical Method

Figure 15:
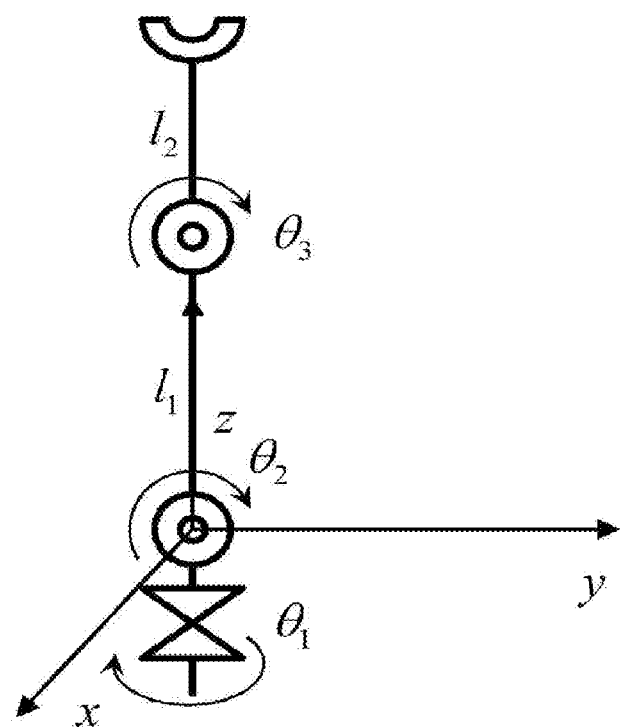
FIG. 15 is a view showing an arm with three joints.

A neural network will concretely be constructed with a three-joint arm as shown in FIG. 15 taken as an example. The forward kinematics of this arm can be expressed as the following expression (21) using a geometric analysis approach.

[Numeral 21]

$$x = \sin\theta_1(l_1\sin\theta_2 + l_2\sin(\theta_2+\theta_3))$$

$$y = \cos\theta_1(l_1\sin\theta_2 + l_2\sin(\theta_2+\theta_3))$$

$$z = l_1\cos\theta_2 + l_2\cos(\theta_2+\theta_3) \quad (21)$$

Figure 16:
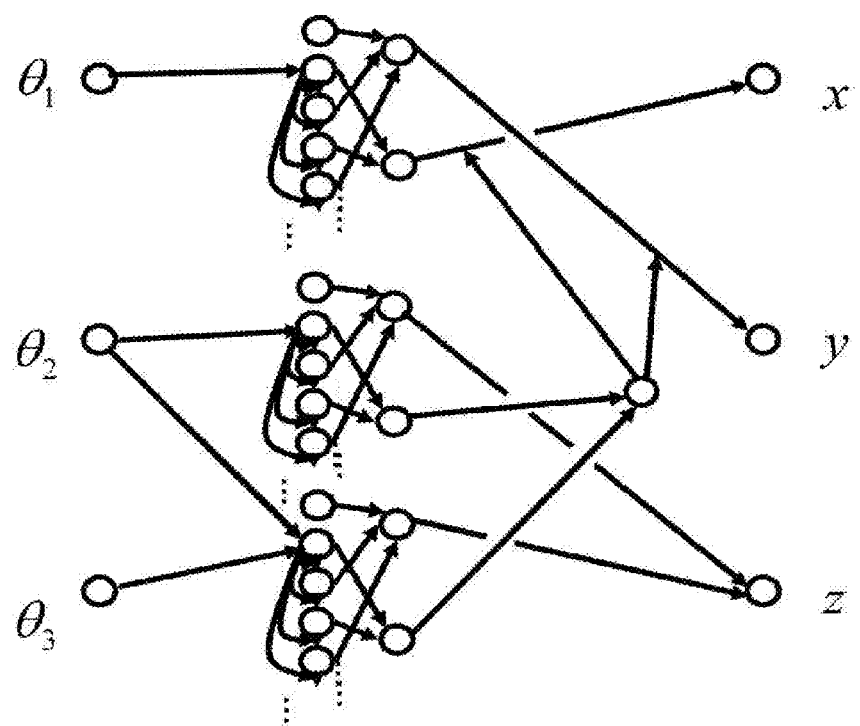
FIG. 16 is a view expressing the arm of FIG. 15 as a neural network.
Figures 17, 18:
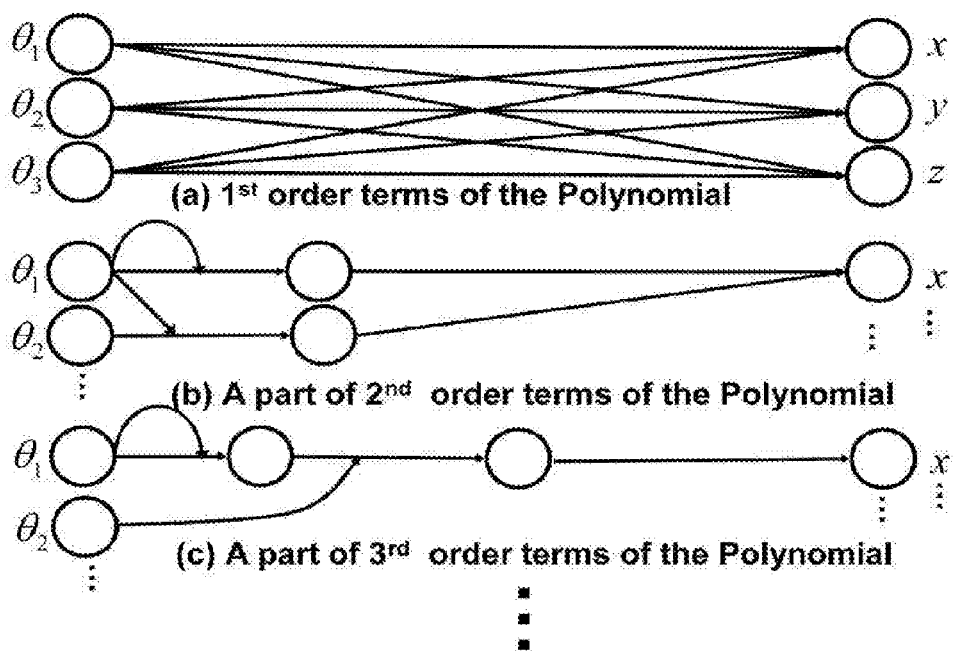
FIG. 17 is a table showing the accuracy estimation of FIG. 15.
FIG. 18 are views showing neural networks in first-order approximation portion, second-order approximation portion, and third-order approximation portion.

When the expression (21) is expressed as the neural network, the configuration as shown in FIG. 16 is obtained. A simple accuracy estimation is shown in FIG. 17. All calculations are performed in double precision within a range of $-\pi/2 \leq \theta_1, \theta_2, \theta_3 \leq \pi/2$. The accuracy estimation is calculated under such a condition of $l_1 = l_2 = 1$. An error is simply expressed by a distance from an answer. The maximum effective digit number of each data value is 3.

The data value in the middle column on the table of FIG. 17 is the maximum error. The maximum error changes depending on the order used. The value of the maximum error becomes minimum when the order is 12. The reason that the accuracy decreases when the order is high is because of effect of rounding errors. The joint angle at the maximum error time is shown in the right column. The maximum error appears at a location comparatively far from the origin of the expansion.

According to the result shown in FIG. 17, it is possible to achieve high accuracy by performing calculation up to an adequate order. In the case of this arm, an error of not more than 0.0456% is obtained when the order is 12. This corresponds to an error of not more than 0.456 mm in an arm having 2 m length. Hereinafter, whether the above behavior can be learned using the numerical perturbation will be described.

4-1-2) Method Using Learning

The problem of the forward kinematics results in a multivariable function fitting problem. Thus, respective coefficients are sequentially calculated based on the assumption as shown in the following equation (22).

[Numeral 22]

$$X(\theta) = X(0) + \left(\delta\theta \cdot \frac{d}{d\theta}\right)X(0) + \frac{1}{2!}\left(\delta\theta \cdot \frac{d}{d\theta}\right)^2 X(0) + \ldots \quad (22)$$

Expressed with elements, the following expression (23) is sequentially estimated from actual measurement values.

[Numeral 23]

$$x_i, \frac{dx_i}{d\theta_j}, \frac{d^2 x_i}{d\theta_j d\theta_k}, \frac{d^3 x_i}{d\theta_j d\theta_k d\theta_l}, \ldots \quad (23)$$

However, the condition $0 \leq i, j, k, l \ldots \leq 3$ needs to be met. When these estimated values are assigned to the expression (22), the forward kinematics is obtained. The estimation is performed by sampling several points while moving the joint angle from the origin of the robot by a very small amount to measure the position thereof and differentially approximating the derivatives.

This expansion is expressed by the bilinear coupling in the neural network notation system. In the case where the number of inputs and outputs is large, it is difficult to express such a network using a two-dimensional figure. The neural networks in first-order approximation portion, second-order approximation portion, and third-order approximation portion are shown in FIGS. 18(*a*), 18(*b*), and 18(*c*). All networks overlap with each other. When calculation is performed after the derivatives up to 12th-order are obtained and rounding errors are eliminated, a result coincides with the solution of the neural network obtained by the analysis.

Considering that a network is constructed from the lower order, neurons are sequentially inserted between input and output as learning progresses. The neurons to be inserted express higher-order terms by the bilinear coupling. This change is a typical example of learning accompanied by the growth of the neural network in the present embodiment. The growth of the neural network structure and determination of the coefficients are made simultaneously.

4-2) Inverse Kinematics

Considered next is inverse transformation. Inverse functions of the trigonometric function appear in the problem of the inverse kinematics. The discussion will be made of processing for the inverse functions.

4-2-1) Analytical Method

There are four solutions of the inverse kinematics shown in FIG. 15. Here, one of the four solutions will be discussed. As to the other three solutions, it is possible to analytically construct the neural network in the same manner.

[Numeral 24]

$$\theta_1 = \arctan\frac{x}{y} \quad (24)$$

$$\theta_3 = \pi - \cos^{-1}\left\{\frac{1}{2l_1l_2}[(x^2+y^2+z^2-(l_1^2+l_2^2))]\right\}$$

$$\theta_2 = \arccos\frac{z}{r} + \alpha$$

When 1/y, arctan(x/y), and arccos(z/r) are Taylor-expanded and approximated to construct the neural network as in the case of the above, a problem of convergence radius occurs with the result that it is impossible to obtain an effective solution by one expansion. This problem can be avoided by adequately dividing the area. This is the idea of so-called analytic continuation (refer to Non-Patent Document 15 (Hideo Takami: "Differential and Integral Calculus of Complex Variable-mathematical book written by scientist 5", kodansha, 1987)).

Figure 19:
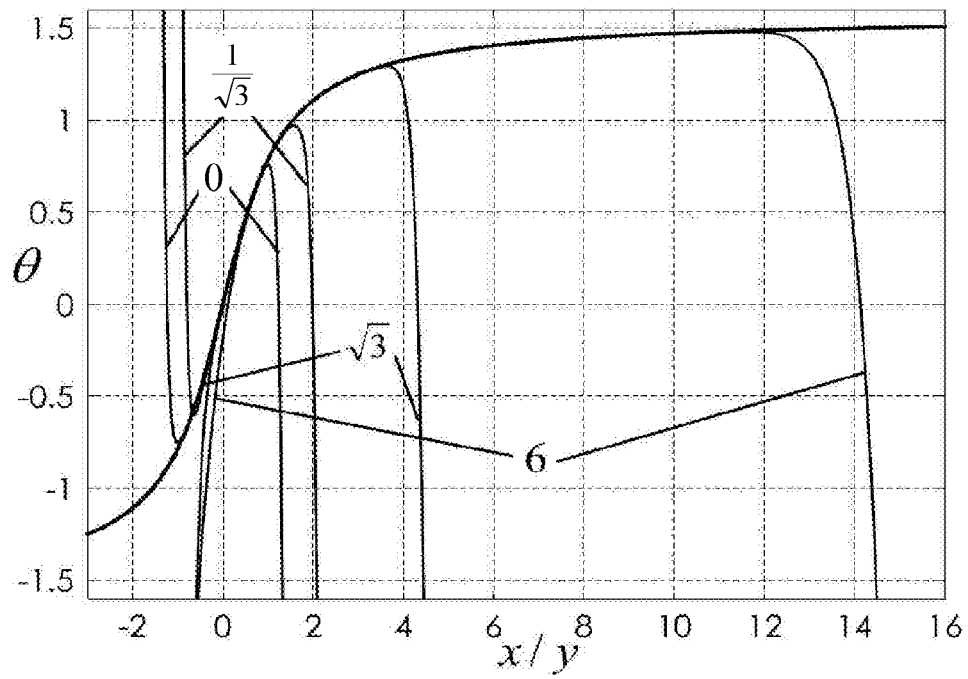
FIG. 19 is a view showing a division example of arctan.

In the case of, for example, arctan(x=y), a singular point exists at a location of ±1 on the complex plane, so that when expansion is performed in the vicinity of a point of x/y=0, conversion is not achieved on reaching a point of ±1. There are various methods, and an example of division of arctan is shown in FIG. 19.

In the case of arctan, approximate solutions expanded in four points of x/y=0, x/y=1√3, x/y=√3, and x/y=6 are shown. When these points are connected to each other, an approximation with high accuracy can be obtained in a wide range. According to the graph of FIG. 19, it can be seen that highly accurate approximation can be obtained only with x/y=0 and x/y=6.

Figure 20:
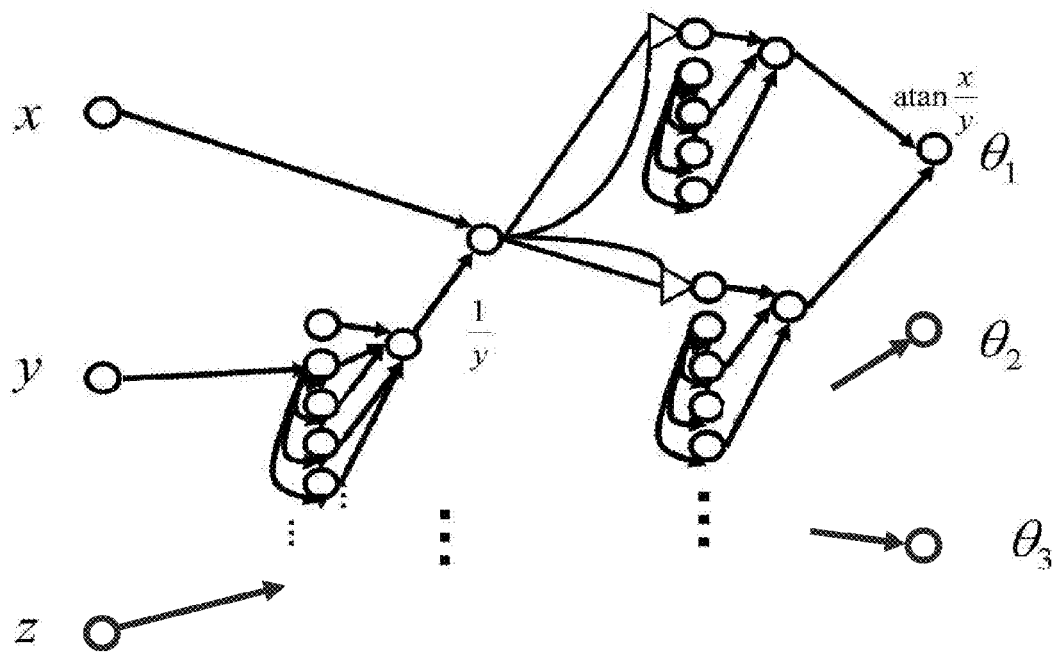
FIG. 20 is a view showing a neural network in the division area.

FIG. 20 shows a part of the neural network including the division areas. Digital switches are used. Also for a calculation like the analytic continuation, the logical operation is indispensable and digital switch needs to be provided.

4-2-2) Method Using Learning

A different point from the learning in the forward kinematics is that approximation cannot be achieved with one polynomial. Excluding this point, the same approach as the forward kinematics is available. Expansion is started from an adequate point and, when an error becomes large, expansion is performed in the vicinity of that point.

4-3) Motion Generation/Control

It is not difficult to generate motion such as a bipedal pattern (refer to Non-Patent Documents 10, 12, and 16 (Riadh Zaier, Fumio Nagashima: "Motion-Generation of Humanoid Robot based on Polynomials Generated by Recurrent Neural Network", AISM2004, Sep. 27, 2004) and 17 (Jiang Shan, Fumio Nagashima: "Neural Locomotion Controller Design and Implementation for Humanoid Robot HOAP-1", 1C34, 2002).

Even traditional kid's toys can walk with two legs. Actually, when a trigonometric function with respect to time and primary expression are used to write a pattern generation program, the bipedal walking can be achieved with simple parameter tuning. Further, it is not so difficult to stabilize the bipedal motion using a sensor feedback. By using an inverted pendulum model, a comparatively stable bipedal motion can be obtained.

Figure 21A:
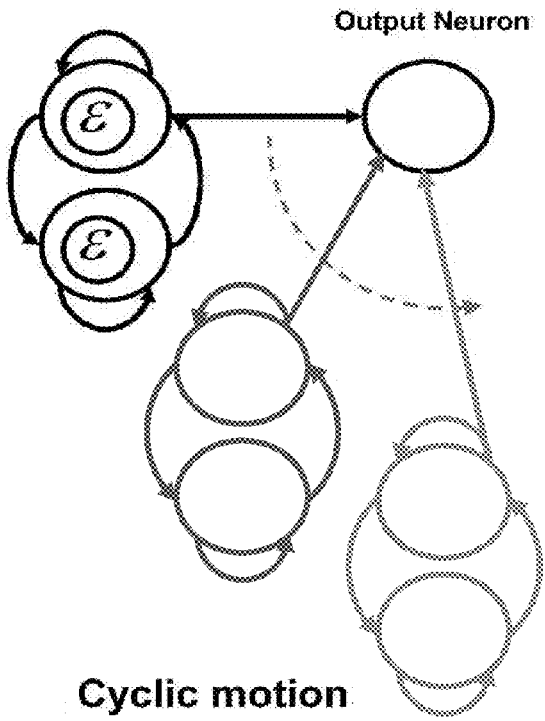
FIGS. 21(a) and 21(b) are views showing growth of a neural network in the case where a basic perturbation is performed.
Figure 21B:
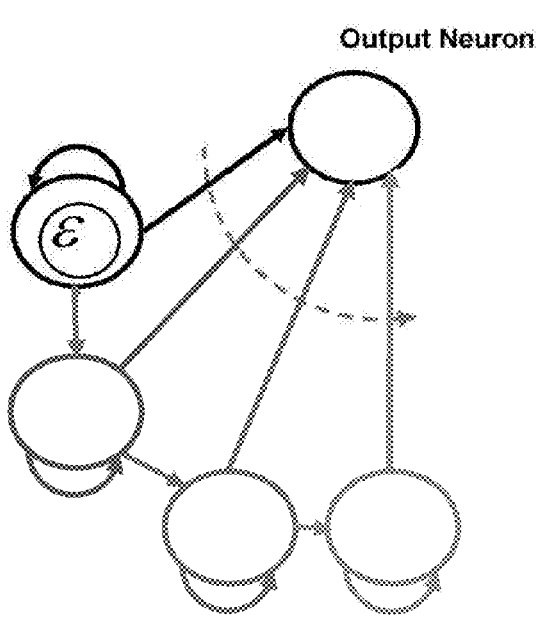

A case where the neural network according to the present embodiment is applied to the motion generation is considered. FIG. 21 shows growth of the neural network in the case where a basic perturbation is performed. In FIG. 21, broken lines denote a direction of growth. FIG. 21 (*a*) is suitable for a cyclic motion, and FIG. 21 (*b*) is suitable for a non-cyclic motion.

Figure 22:
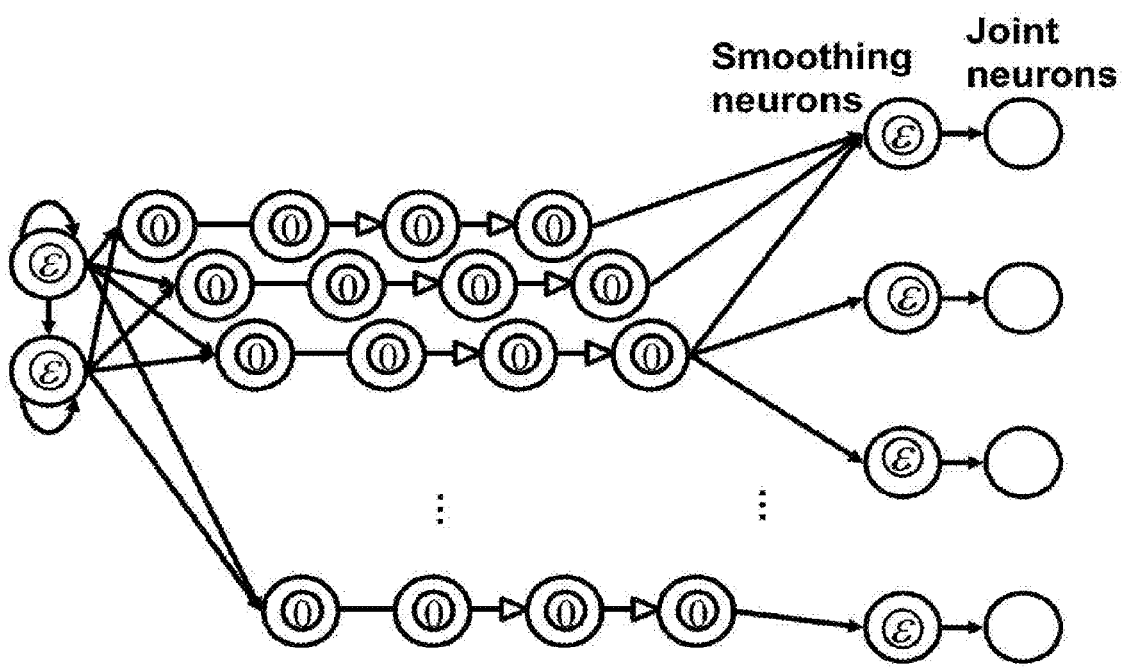
FIG. 22 is a view showing a concrete example of a neural network corresponding to a motion of kicking a ball which is simple non-cyclic motion.
Figure 23:
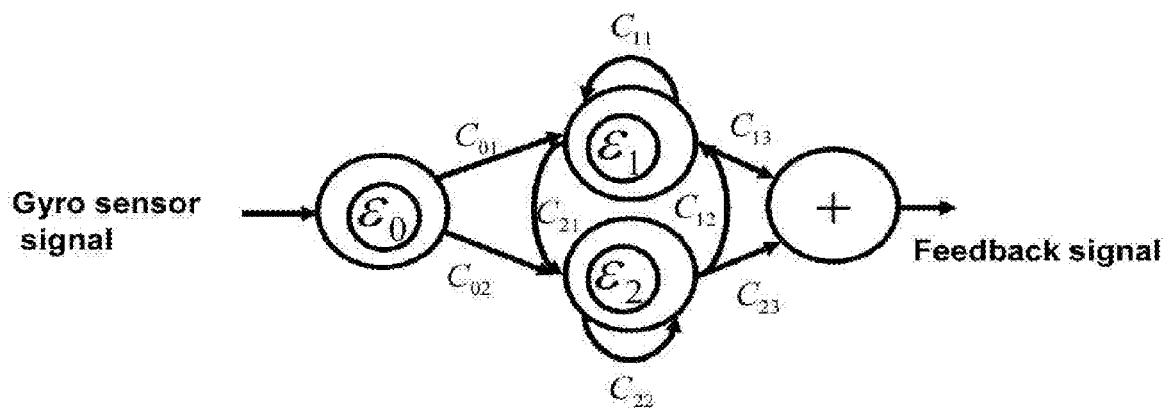
FIG. 23 is a view showing a feedback neural network for ensuring stability.

FIG. 22 shows a concrete example of a neural network corresponding to a motion of kicking a ball which is simple non-cyclic motion (refer to the above Non-patent document 16). FIG. 23 shows a feedback neural network for ensuring stability.

4-4) Voice Analysis

In general, when voice information is processed, the voice itself is not used, but processing is applied to a result obtained by Fourier-decomposing the voice. Although the neural network according to the present embodiment cannot perform the Fourier decomposition, it can perform its corresponding processing.

Figure 24A:
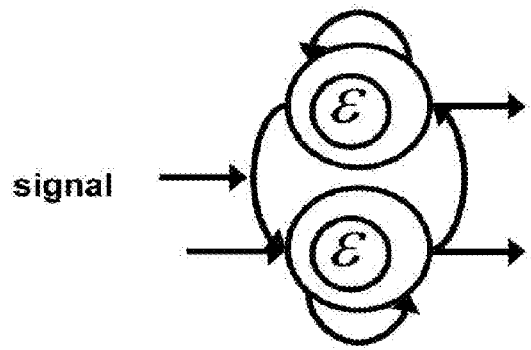
FIGS. 24(a) and 24(b) are views showing a neural network called CRP.
Figure 24B:
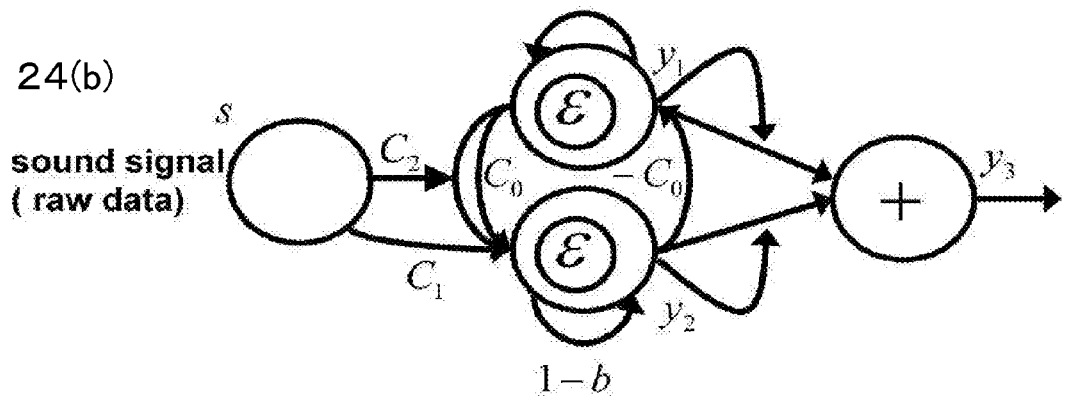

The abovementioned CPG resonates when the external force term which is a second-order ordinary differential equation acts thereon. Further, when the coupling weight is changed using a voice signal, a Mathieu type excitation phenomenon occurs. Using the resonance and excitation phenomenon, decomposition different from the Fourier decomposition can be achieved. Here, this network is referred to as CPR (Central pattern Recognizer). More concretely, FIG. 24 (*a*) shows a base CPR network, and FIG. 24 (*b*) shows an element network actually used for voice decomposition. Using a mathematical expression, the network shown in FIG. 24 (*b*) can be expressed as the following expressions (25) to (27).

[Numeral 25]

$$\frac{d^2y_1}{dt^2} + \beta\frac{dy_1}{dt} + \omega^2(1+\delta_m s)y_1 = -\delta_f s \quad (25)$$

[Numeral 26]

$$y_2 = \frac{1}{\omega}\frac{dy_1}{dt} \quad (26)$$

[Numeral 27]

$$y_3 = y_1^2 + y_2^2 \quad (27)$$

In the above expressions, $\beta=b/\epsilon$, $\omega=C_0/\epsilon$, $\delta_m=C_2/C_0$, $\delta_f=C_0C_1/\epsilon^2$, $y_1$, $y_2$, and $y_3$ are the state quantity of the neuron, and s is raw data of voice.

The equation (25) is known as an equation that generates both resonance and excitation. The equations (25) and (26) have phases shifted from each other, and the relation corresponding to that between sin and cos. Therefore, the square of the amplitude of an oscillator generating the resonance and excitation is output to y3.

Figure 25:
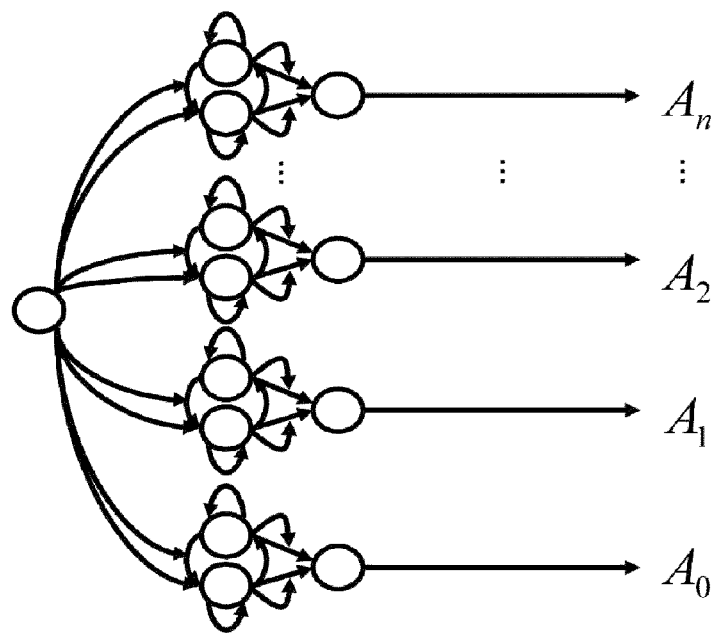
FIG. 25 is a neural network for voice recognition.
Figure 26:
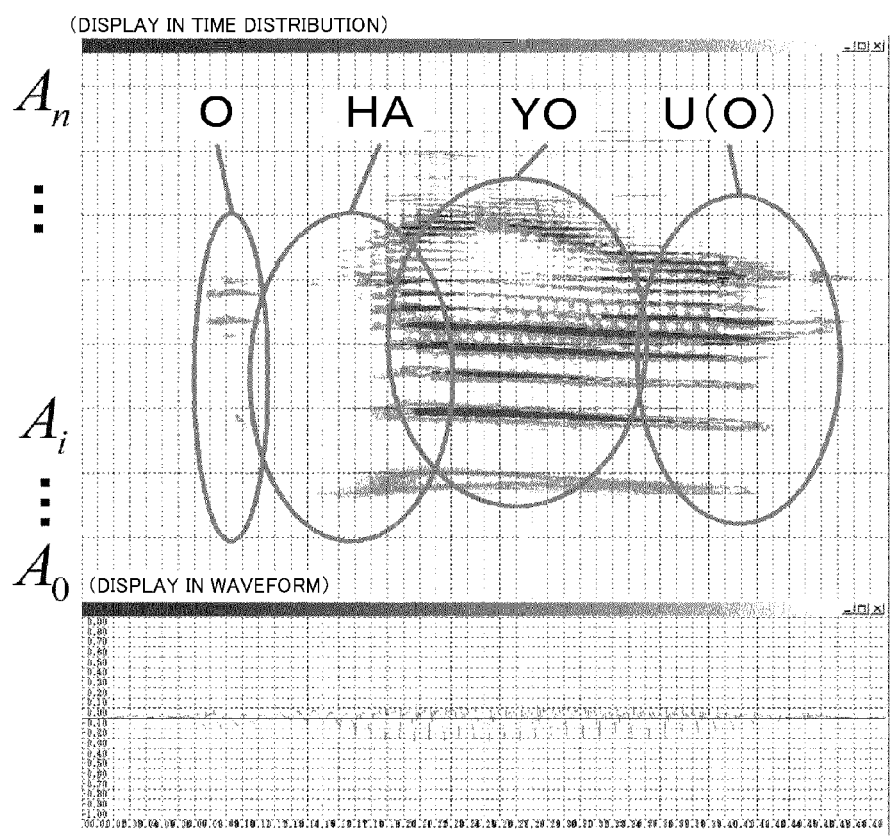
FIG. 26 is a view showing a voice recognition result using the CRP.

When a plurality of the element networks are used as shown in FIG. 25, the voice can be decomposed as shown in FIG. 26. The voice used in the experiment of FIG. 26 is "Ohayo" (in Japanese), the number of CPRs is 512, and $\omega(=C_0/\epsilon)$ is, when expressed as a frequency, a value obtained by equally dividing 50 Hz to 20,000 Hz into 511 as a logarithm. The vertical axis is the output of respective CPRs, and horizontal axis is time.

The lower portion of the CRP corresponds to the lowest frequency and the frequency becomes higher toward the uppermost portion. A portion at which the contrast is high denotes CPR having large output. Further, the following figure shows the voice data at the time. By using the output of the network as an input, it is possible to apply a conventional voice recognition algorithm. As one method, there is available the abovementioned correlation operation.

4-5) Logical Operation

Figure 27:
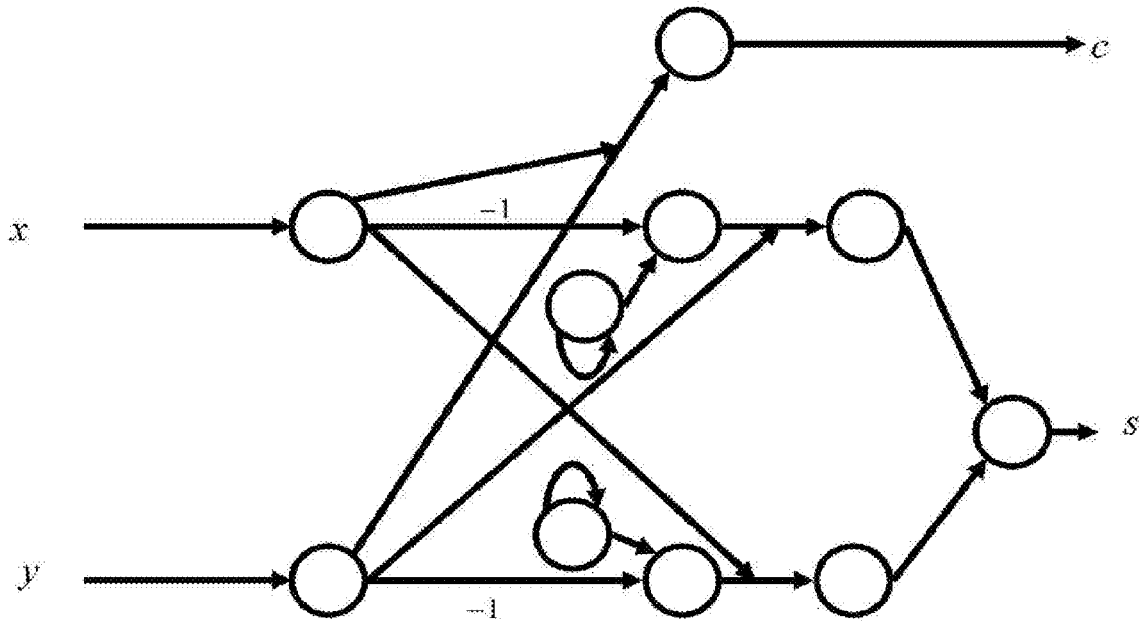
FIG. 27 is a view showing a neural network representing a bit half-adder.

As an application example of a logical element, a neural network of a bit half-adder is shown in FIG. 27. The half-adder is a basic logical circuit for performing operation of a least significant bit used at, e.g., the time of addition of integers. Therefore, there is no carry from the lower digit and there is only carry to the upper digit.

x and y are inputs, s and c are outputs, s is a calculation result of the corresponding digit, and c is carry to the next order. All the coupling weights omitted in FIG. 27 is 1, and delay of all the neurons $\epsilon$ omitted is 0. In terms of efficiency, such a neural network is meaningless. However, to express various processing using the same notation system is what counts.

4-6) Sensor Integration

Information from one sensor is anything more than part of information concerning environment. In order to recognize environment, it is necessary to determine information from various sensors in a comprehensive manner. In such a case, a system specialized in a specific sensor group has often been constructed. Such a system does not permit a change of the sensor type.

Further, using the neural network for achievement of generalization is now under consideration. However, since a specific algorithm is generally implemented in individual sensors, it is difficult to interface with sensors of various types.

In the case where all the processing is expressed by a neural network in a uniformed manner as the method of the present embodiment, integration of sensors can be made very easily. That is, a general method like the correlation operation can be used for the sensor integration.

Figure 28:
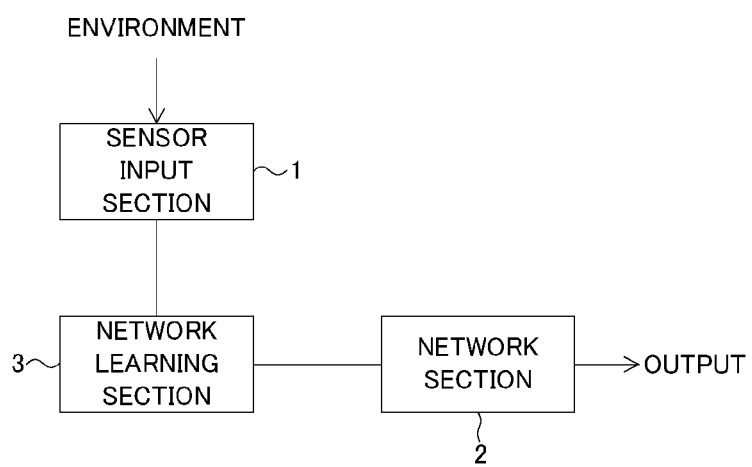
FIG. 28 is a block diagram showing a configuration of an embodiment of the present invention.
Figure 29:
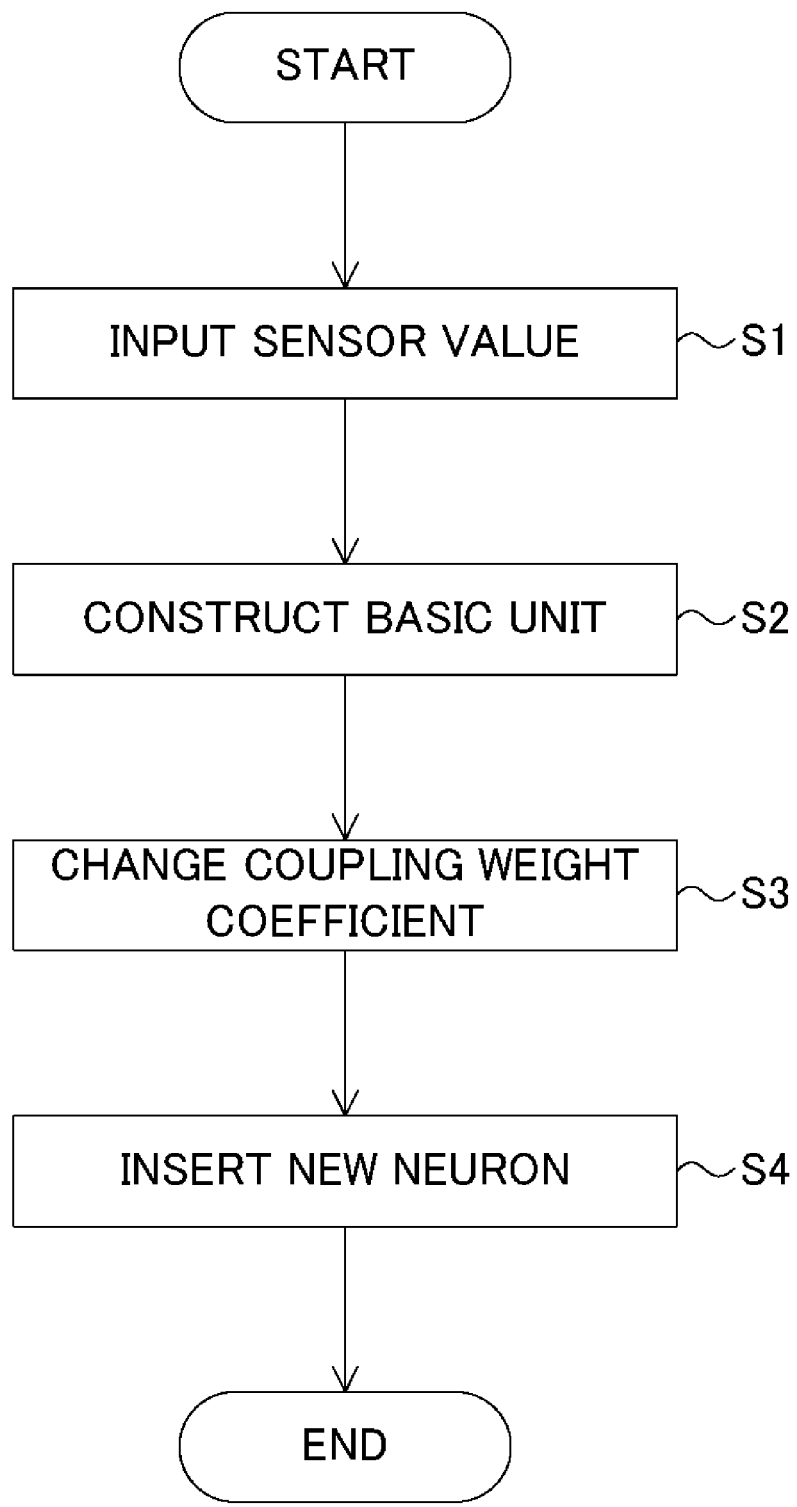
FIG. 29 is a flowchart showing operation of the present embodiment.

A block diagram of a configuration of the embodiment of the present invention is shown in FIG. 28 and operation thereof is shown in FIG. 29. A neural network learning device according to the present embodiment includes a sensor input section 1 that inputs a sensor output, a network section 2 composed of neural networks, and a network learning section 3 that evaluates the value of the sensor value input from the sensor input section 1 in a comprehensive manner and generates/constructs the network section based on the evaluation result.

According to the operation procedure shown in FIG. 28, the network learning section 3 constructs a network serving as a basic unit in the network section 2 (step 1). Subsequently, the learning section acquires an input from the sensor input section 1 and makes evaluation of the sensor value (step S2), uses a correlation operation to change a coupling weight coefficient so that the evaluation value satisfies a predetermined evaluation value (step S3), and inserts a new neural network according to need (step S4). At this time, the learning section calculates a derivative using differential approximation while sampling the results for the input at fine points and inserts a neural network from the lower order position to the higher one.

The present embodiment has the following features, as described in the structure of the neural network suitable for construction of a human-friendly robot software system and its application example.

(1) Able to implement various processing using uniform notation system (2) Able to dynamically change structure of neural network With the above features, the system software becomes very flexible. In order to cope with various types of environmental changes, automatization of a neural network generation process or study/development and realization of a general-purpose learning algorithm are desired. The present embodiment provides a guide and base unit for constructing such a large-scale neural network.

In the embodiment of the present invention, a neural network used for constructing a human-friendly robot software system has been provided. The proposed neural network is based on linear analog delay and can express the linear algebraic equation and linear differential equation. Therefore, the neural network of the embodiment can implement a control algorithm, recognition algorithm, or the like which has conventionally been used. Further, a nonlinear algorithm can also be implemented using the same notation system.

The perturbation method is used for expansion of a linear neural network. It is possible to adapt to an environment including a nonlinear phenomenon only with the perturbation. As application, examples of motion generation/control, voice analysis, and logical circuit have been shown.

Further, in the embodiment of the present invention, by storing respective steps shown in the flowchart in a computer-readable storage medium as a neural network learning program, it is possible to allow a computer to execute the neural network learning method. The computer-readable medium mentioned here includes: a portable storage medium such as a CD-ROM, a flexible disk, a DVD disk, a magneto-optical disk, or an IC card; a database that holds computer program; another computer and database thereof; and a transmission medium on a network line.

INDUSTRIAL APPLICABILITY

By acquiring existing techniques in a neural network model studied and developed so as to generalize them as an element technique and adding new values to the existing techniques, it is possible to provide modeling of a basic unit of bottom-up approach using the neural network. This makes it possible to dynamically and promptly construct a large-scale neural network.

The invention claimed is:

1. A neural network learning device using a perturbation method as a learning method, comprising:
   a network section that includes a neural network;
   an input section that inputs, in an integral manner, a state in a given environment; and
   a learning section that samples a relationship between an input value of the state and an output value which is output from the neural network in response to input of the input value, in units of a minute motion, calculates an evaluation value based on the relationship so as to evaluate the input value, determines a coupling weight coefficient between neurons of the neural network using a correlation operation in order that the evaluation value satisfies a predetermined evaluation value, and inserts at least one neuron into the neural network from a lower order position to a higher order position.

2. The neural network learning device according to claim 1, wherein
   the learning section performs the correlation operation using Hebb's law.

3. The neural network learning device according to claim 1, wherein
   the learning section performs the correlation operation using derivative deduction.

4. The neural network learning device according to claim 3, wherein
   the learning section uses difference approximation when performing the derivative deduction.

5. The neural network learning device according to claim 1, wherein the learning section substantially simultaneously performs determination of the coupling weight coefficient and insertion of the at least one neuron.

6. A computer-readable storage medium having recorded thereon a neural network learning program that uses a perturbation method as a learning method, the program allowing the computer, which has a network section including a neural network, to execute a process comprising:
- inputting a state in a given environment in an integral manner;
- sampling a relationship between an input value of the state and an output value which is output from the neural network in response to input of the input value, in units of a minute motion, and calculating an evaluation value based on the relationship so as to evaluate the input value;
- determining a coupling weight coefficient between neurons of the neural network using a correlation operation in order that the evaluation value satisfies a predetermined evaluation value; and
- inserting at least one neuron into the neural network from a lower order position to a higher order position.

7. The computer-readable storage medium according to claim 6, wherein
the determining performs the correlation operation using Hebb's law.

8. The computer-readable storage medium according to claim 6, wherein
the determining performs the correlation operation using derivative deduction.

9. The computer-readable storage medium according to claim 8, wherein
the determining uses difference approximation when performing the derivative deduction.

10. The computer-readable storage medium according to claim 6, wherein the determining and the inserting are performed substantially simultaneously.

11. A neural network learning method allowing a computer to execute a neural network learning that uses a perturbation method as a learning method, the computer including a network section which includes a neural network, comprising:
- inputting a state in a given environment;
- sampling a relationship between an input value of the state and an output value which is output from the neural network in response to input of the input value, in units of a minute motion, and calculating an evaluation value based on the relationship so as to evaluate the input value;
- determining a coupling weight coefficient between neurons of the neural network using a correlation operation in order that the evaluation value satisfies a predetermined evaluation value; and
- inserting at least one neuron into the neural network from a lower order position to a higher order position.

12. The neural network learning method according to claim 11, wherein the determining and the inserting are performed substantially simultaneously.

* * * * *